US009117483B2

(12) United States Patent
Zaletel

(10) Patent No.: US 9,117,483 B2
(45) Date of Patent: Aug. 25, 2015

(54) METHOD AND APPARATUS FOR DYNAMICALLY RECORDING, EDITING AND COMBINING MULTIPLE LIVE VIDEO CLIPS AND STILL PHOTOGRAPHS INTO A FINISHED COMPOSITION

(76) Inventor: Michael Edward Zaletel, Gilbert, AZ (US)

( * ) Notice: Subject to any disclaimer, the term of this patent is extended or adjusted under 35 U.S.C. 154(b) by 29 days.

(21) Appl. No.: 13/228,218

(22) Filed: Sep. 8, 2011

(65) Prior Publication Data
US 2012/0308209 A1    Dec. 6, 2012

Related U.S. Application Data

(60) Provisional application No. 61/507,472, filed on Jul. 13, 2011, provisional application No. 61/493,219, filed on Jun. 3, 2011.

(51) Int. Cl.
G11B 27/00    (2006.01)
G11B 27/034    (2006.01)
H04N 5/262    (2006.01)
G11B 27/34    (2006.01)

(52) U.S. Cl.
CPC .............. G11B 27/034 (2013.01); G11B 27/34 (2013.01); H04N 5/2621 (2013.01)

(58) Field of Classification Search
CPC . H04N 5/2621; H04N 5/23293; G11B 27/34; G11B 27/034
USPC .......... 386/280, 282, 285, 326; 715/201, 716, 715/719, 726
See application file for complete search history.

(56) References Cited

U.S. PATENT DOCUMENTS

| | | | |
|---|---|---|---|
| 6,292,218 B1 | 9/2001 | Parulski et al. | |
| 6,683,649 B1 | 1/2004 | Anderson | |
| 6,738,075 B1 | 5/2004 | Torres et al. | |
| 7,020,381 B1 | 3/2006 | Kato et al. | |
| 7,171,113 B2 | 1/2007 | Parulski et al. | |
| 7,221,520 B2 | 5/2007 | Dowling et al. | |
| 7,246,316 B2 | 7/2007 | Furlong et al. | |
| 7,295,244 B2 | 11/2007 | Manico et al. | |
| 7,337,403 B2 | 2/2008 | Pavley et al. | |
| 7,342,604 B2 | 3/2008 | Kito et al. | |
| 7,408,582 B2 | 8/2008 | Prabhu et al. | |
| 7,409,411 B2 | 8/2008 | Sato | |
| 7,532,807 B2 * | 5/2009 | McKain et al. | 386/326 |
| 7,554,570 B2 | 6/2009 | Benco et al. | |
| 7,593,045 B2 | 9/2009 | Ikeda et al. | |
| 7,827,491 B2 * | 11/2010 | Tran | 715/719 |

(Continued)

Primary Examiner — Thai Tran
Assistant Examiner — Stephen Smith
(74) Attorney, Agent, or Firm — Belles Katz LLC

(57) ABSTRACT

The present invention relates to a method of dynamically creating a video composition including the steps: a) recording a first real-world event as a first video clip using a video composition creation program residing on a portable device in response to a first user record input, the portable device comprising a camera lens, a processor, a memory device, and a display device that displays an image of the first real-world event perceived by the camera lens during the recording of the first real-world event; and b) selecting a transition using the video composition creation program in response to a user transition selection input, the video composition creation program automatically combining the first video clip and the selected transition to create the video composition; and c) the video composition creation program saving the video composition on the memory device as a single file in response to a user save input.

14 Claims, 29 Drawing Sheets

(56) References Cited

U.S. PATENT DOCUMENTS

| | | | |
|---|---|---|---|
| 7,975,226 B2 * | 7/2011 | Blose et al. | 715/726 |
| 8,046,688 B2 * | 10/2011 | Adams et al. | 715/723 |
| 8,201,073 B2 * | 6/2012 | Canora et al. | 715/201 |
| 8,306,399 B1 * | 11/2012 | Trottier et al. | 386/280 |
| 2002/0033844 A1 | 3/2002 | Levy et al. | |
| 2002/0106191 A1 | 8/2002 | Betz et al. | |
| 2002/0126226 A1 | 9/2002 | Dudkowski | |
| 2003/0147465 A1 | 8/2003 | Wu et al. | |
| 2004/0004665 A1 * | 1/2004 | Kashiwa | 348/239 |
| 2004/0085341 A1 * | 5/2004 | Hua et al. | 345/723 |
| 2004/0218050 A1 | 11/2004 | Lee et al. | |
| 2005/0002643 A1 | 1/2005 | Smith | |
| 2005/0053352 A1 * | 3/2005 | McKain et al. | 386/46 |
| 2005/0141859 A1 | 6/2005 | Cheatle | |
| 2006/0093309 A1 | 5/2006 | Herberger et al. | |
| 2006/0187331 A1 | 8/2006 | Watanabe et al. | |
| 2007/0074115 A1 * | 3/2007 | Patten et al. | 715/716 |
| 2007/0254640 A1 | 11/2007 | Bliss | |
| 2007/0262995 A1 | 11/2007 | Tran | |
| 2008/0019661 A1 * | 1/2008 | Obrador et al. | 386/52 |
| 2009/0142030 A1 * | 6/2009 | Lee et al. | 386/52 |
| 2009/0153678 A1 | 6/2009 | Nonaka et al. | |
| 2009/0238538 A1 | 9/2009 | Fink | |
| 2010/0067863 A1 | 3/2010 | Wang et al. | |
| 2010/0119203 A1 | 5/2010 | Lewis | |
| 2010/0146393 A1 | 6/2010 | Land et al. | |
| 2010/0161635 A1 | 6/2010 | Dey | |
| 2010/0238194 A1 | 9/2010 | Roach, Jr. | |
| 2011/0058052 A1 | 3/2011 | Bolton et al. | |
| 2011/0107220 A1 | 5/2011 | Perlman | |
| 2011/0131299 A1 | 6/2011 | Sardary | |
| 2011/0142420 A1 * | 6/2011 | Singer | 386/280 |
| 2012/0155848 A1 * | 6/2012 | Labowicz et al. | 396/299 |
| 2013/0113946 A1 * | 5/2013 | Fisher et al. | 348/207.1 |

* cited by examiner

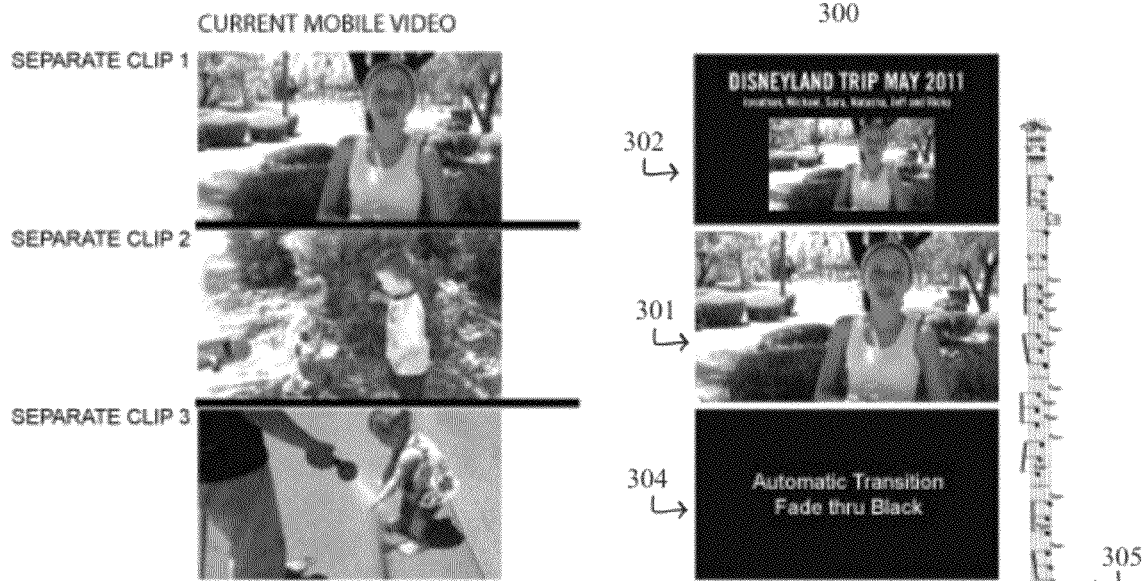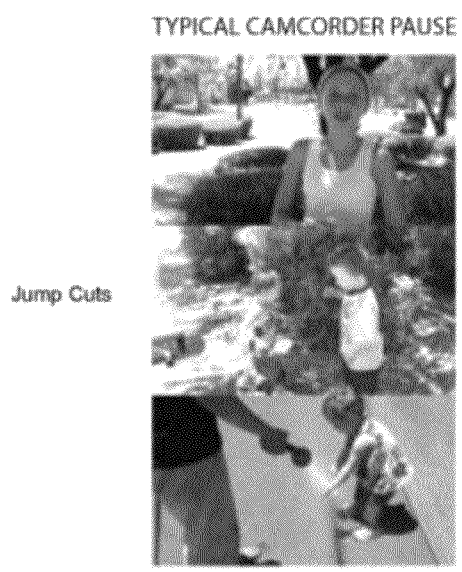
FIGURE 1
FIGURE 2
FIGURE 3

JOIN US

METHOD AND APPARATUS FOR DYNAMICALLY RECORDING, EDITING AND COMBINING MULTIPLE LIVE VIDEO CLIPS AND STILL PHOTOGRAPHS INTO A FINISHED COMPOSITION

CROSS REFERENCE TO RELATED PATENT APPLICATIONS

The present application claims the benefit of U.S. Provisional Application Ser. No. 61/507,472, filed Jul. 13, 2011, which in turn claims the benefit of U.S. Provisional Application Ser. No. 61/493,219, filed Jun. 3, 2011, the entireties of which are hereby incorporated by reference.

FIELD OF THE INVENTION

The present invention relates to methods and apparatuses for dynamically and simultaneously recording, editing and combining multiple live video clips and still photographs with filters, transitions, music, titles and credits into a finished composition.

BACKGROUND OF THE INVENTION

The proliferation of cameras and camcorders, especially within smart phones, has resulted in many people having a camera on them at all times. In many instances, a user will sporadically capture videos and still photographs with their camera at various times during one event (e.g. a birthday party, a tourist attraction, a sporting event, etc.). All of the video clips and still photographs typically stay on the user's camera as separate individual files until, at some later time, the user downloads the video clips and still photographs to a personal computer or loads them into a mobile video editing application one at a time. Even after downloading the video clips and still photographs to a personal computer, the video clips and still photographs are still saved as separate, individual files.

If the user would like to collectively view all of the video clips and still photographs from one event, the user is required to install and learn how to use a picture/video compilation program in order to combine the pictures and videos into one seamless, edited presentation. Further, some users prefer to include titles, credits, music backgrounds, video filters and transitions within their video/photographs compilations. This requires the user to further learn and edit the individual files on their personal computer or mobile device consuming both the user's time and effort. Since for many users there is no easy way to combine all of the pictures and videos captured from one event, the video clips and still photographs will usually remain separate files, never to be easily viewed as one presentation.

With camcorders and mobile cameras, a user may record and save multiple, usually limited-length, video clips and still photographs. The videos clips and photographs are usually saved directly to memory within the camcorder or mobile camera and comprise associated metadata specifying the length, time and date the video clip or photograph was recorded. With camcorders, a user may record and save multiple video clips. Further, a user may record, pause and resume recording at a later time.

Referring to FIG. 1, a representation of a video clip from a current mobile video camera/camcorder according to the prior art is illustrated. The video clip of FIG. 1 illustrates how prior art mobile video camera/camcorders store and present multiple video clips. As shown in FIG. 1, the multiple video clips are saved and stored as separate files in memory of the prior art mobile video camera/camcorders. Therefore, if a user would like to create a composition of an event, they would be required to download and edit the various video clips on a personal computer.

Referring to FIG. 2, a representation of a video clip from a current video camcorder according to the prior art is illustrated. The video clip of FIG. 2 illustrates how prior art video camcorders store and present multiple video clips. As shown in FIG. 2, the multiple video clips are saved and stored as a continuous video file with basic jump cuts automatically inserted in between the separate files. Therefore, as noted above, in order for the user of an existing prior art camera/camcorder to create a finalized composition of video clips and/or photographs with transitions, music backgrounds, filter, etc., the user is required to download all the files to a personal computer and use video/photograph editing software to create a finalized composition.

Prior art cameras and camcorders do not allow for a user to insert a title, credits, volume-mixed music backgrounds, or transitions before between or after their pictures and video clips as they are being recorded. Therefore, in order for the user to combine all the pictures and video clips from a specific event (e.g. a birthday, a holiday, a vacation) and to include a title, credits, music and/or transitions, the user must download all the pictures and video clips to a personal computer installed with a picture/video compilation program, and manually edit the selected pictures and video clips on the personal computer to create a finished video. This requires the user to own and learn how to use the video compilation program in order to create one extended video summarizing an event. Thus, there is a need for a method and apparatus that can automatically combine multiple pictures and videos clips together with transitions, filters, music backgrounds, titles, and credits, using a camera/camcorder as the pictures and videos are being recorded.

Further, there exists prior art applications, such as iMovie® for the iPhone®, that enable a user to edit their individual video clips and still photographs into a final composition on a mobile device. However, prior art applications require that the user exit the editing timeline and enter a separate camera mode in order to record a single video clip or still photograph. Without a constant live preview of the event, users often miss an important moment they would like to record while they are switching back and forth between the camera mode and editing timeline mode. Therefore, there exists a need for an application that allows the user to create a final composition of multiple video clips and still photographs without having to exit the camera/camcorder function of the application, and thus allows the user to capture any moment that may arise while they are also simultaneously creating a composition with seamlessly added transitions, filters, music, titles and credits.

SUMMARY OF THE INVENTION

In one embodiment, the present invention relates to methods and apparatuses for recording, editing, and combining multiple video clips and still photographs with transitions, filters, music, titles and credits into a finished composition.

In another embodiment, the present invention allows for the user to preview live video action while simultaneously maintaining the instant ability to add video clips and still photographs captured from the live action at any moment or delete the last video clip captured and to combine those video clips and still photographs with transitions, filters, credits, titles, music and other effects into a finished composition.

In yet another embodiment, the present invention is an application that allows the user to create a composition without having to exit the camera/camcorder application or camera/camcorder portion of the application, and thus allows the user to capture any moment that may arise and add a video clip of that moment to their composition while they are also simultaneously creating a composition with seamlessly added transitions, filters, credits, titles, music and other effects.

In yet another embodiment, the present invention is a method of dynamically creating a video composition comprising: a) recording a first real-world event as a first video clip using a video composition creation program residing on a portable device in response to a first user user record input, the portable device comprising a camera lens, a processor, a memory device, and a display device that displays an image of the first real-world event perceived by the camera lens during the recording of the first real-world event; and b) selecting a transition using the video composition creation program in response to a user transition selection input, the video composition creation program automatically combining the first video clip and the selected transition to create the video composition; and c) the video composition creation program saving the video composition on the memory device as a single file in response to a user save input.

In yet another embodiment, the present invention is a portable device comprising: a camera lens, a processor, a memory device, and a display device operably coupled together; a video composition creation program residing on the portable device, the video composition creation program configured to: (1) initiate a recording session upon receipt of a first user record input, thereby recording a first real-world event perceived by the camera lens as a first video clip; (2) display an image of the first real-world event perceived by the camera lens during the recording of the first real-world event on the display device; (3) provide a user with a plurality of selectable transitions; (4) automatically combine a transition selected by the user and the first video clip to create a video composition; and (5) conclude the recording session and save the video composition on the memory device as a single file in response to a user save input.

A method of dynamically creating a video composition comprising: a) selecting a recording mode using a video composition creation program residing on a portable device, the recording mode comprising at least one of a predetermined transition or a predetermined music clip, and the portable device comprising a camera lens, a display device and a memory device; b) initiating a single recording session using the media composition creation program, the single recording session comprising recording a first real-world event and a second real-world event, the first real-world event being recorded as a first video clip and the second real-world event being recorded as a second video clip; c) the video composition creation program automatically combining the first video clip, the second video clip and the predetermined transition or the predetermined music clip to create the video composition; and d) the video composition creation program saying the video composition on the memory device as a single file in response to a user save input, thereby concluding the single recording session.

A method of dynamically creating a video composition comprising: a) initiating a recording session on a video composition creation program, the video composition creation program residing on a first portable device; b) recording a first real-world event as a first video clip using the video composition creation program, the first portable device comprising a first video camera lens, a first memory device, and a first display device that displays an image of the first real-world event perceived by the first video camera lens during the recording of the first real-world event; c) selecting a transition using the video composition creation program, the video composition creation program automatically combining the selected transition and the first video segment; d) selecting a second portable device using the video composition creation program residing on the first portable device; e) recording a second real-world event as a second video segment with a second video camera lens residing on the second portable device, the second real-world event recorded using the video composition creation program residing on the first portable device, the first display device configured to display an image of the second real-world event perceived by the second video camera lens during the recording of the second real-world event; f) the video composition creation program automatically combining the first video segment, the transition and the second video segment in the composition; and g) the video composition creation program saying the video composition on the first memory device as a single file.

DRAWINGS

FIG. 1 is a representation of a video clip from a current portable video camera/camcorder according to the prior art.

FIG. 2 is a representation of a video clip from a video camcorder according to the prior art.

FIG. 3 is a representation of a composition created by a portable device according to one embodiment of this present invention.

Figure 19A:
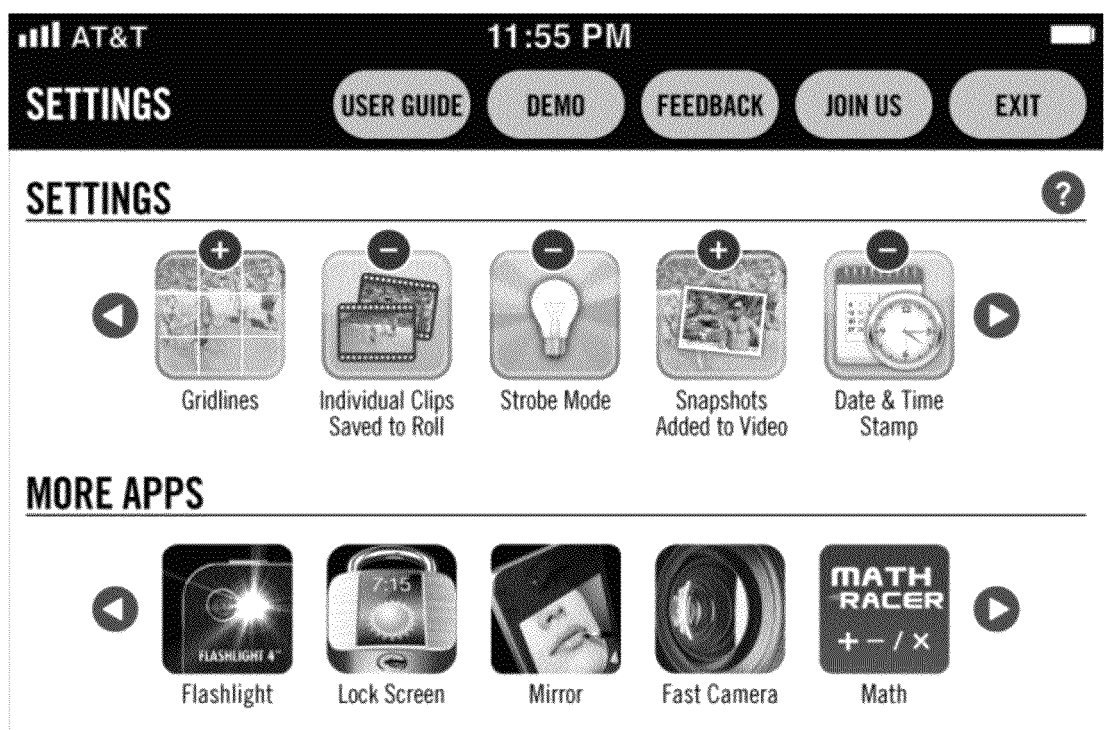
Figure 19B:
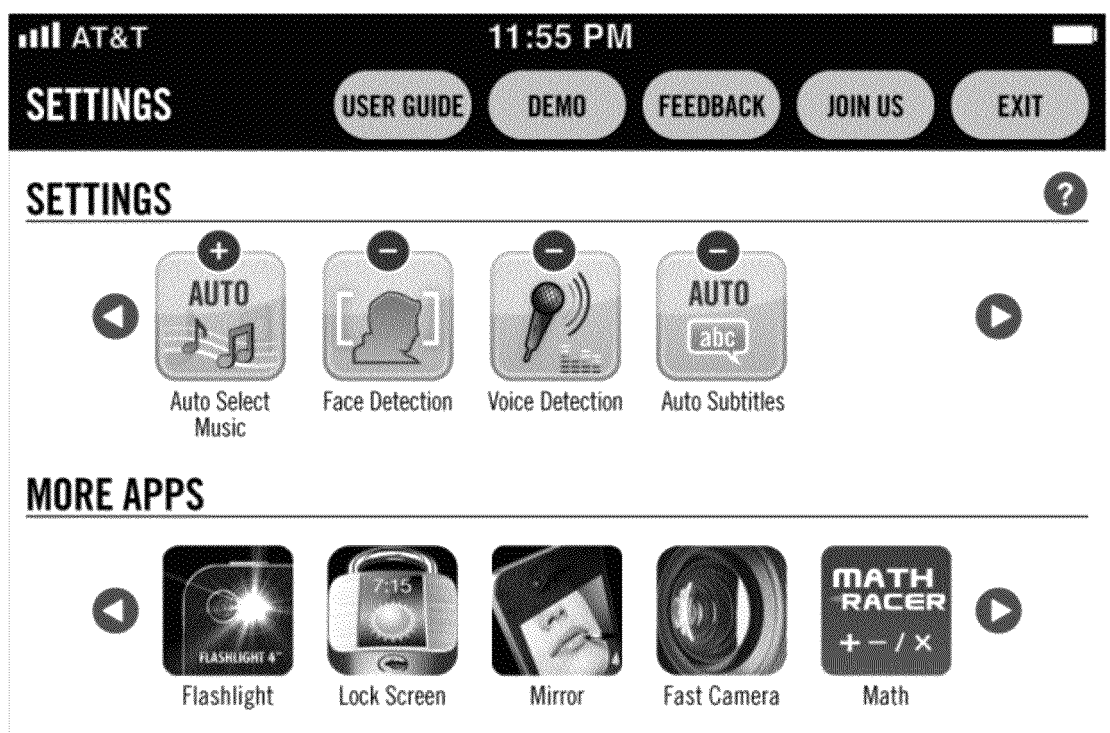

FIGS. 19A-B are perspective views of various settings screens according to one embodiment of the present invention.

Figure 20:
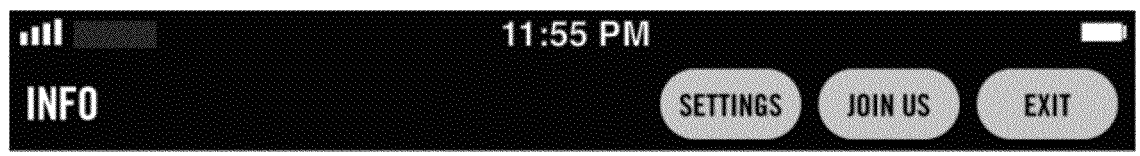
Figure 20:
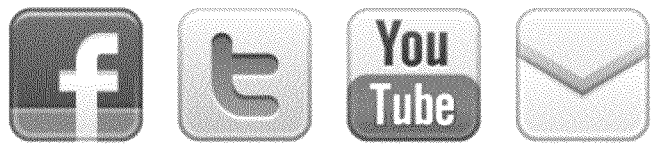

FIG. 20 is a perspective view of a "Join Us" screen according to one embodiment of the present invention.

Figure 21:
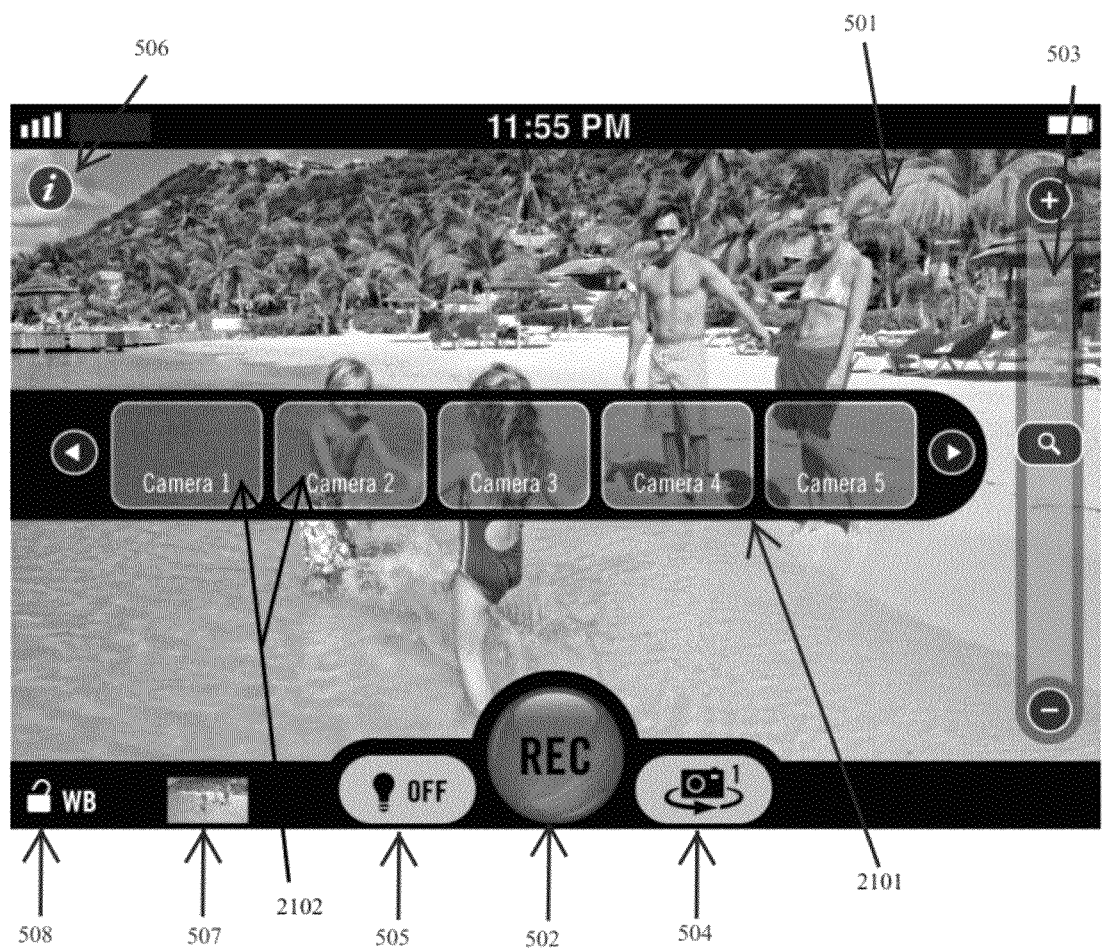

FIG. 21 is a perspective view of a display of a portable device that is connected with other shared cameras according to one embodiment of the present invention.

Figure 22:
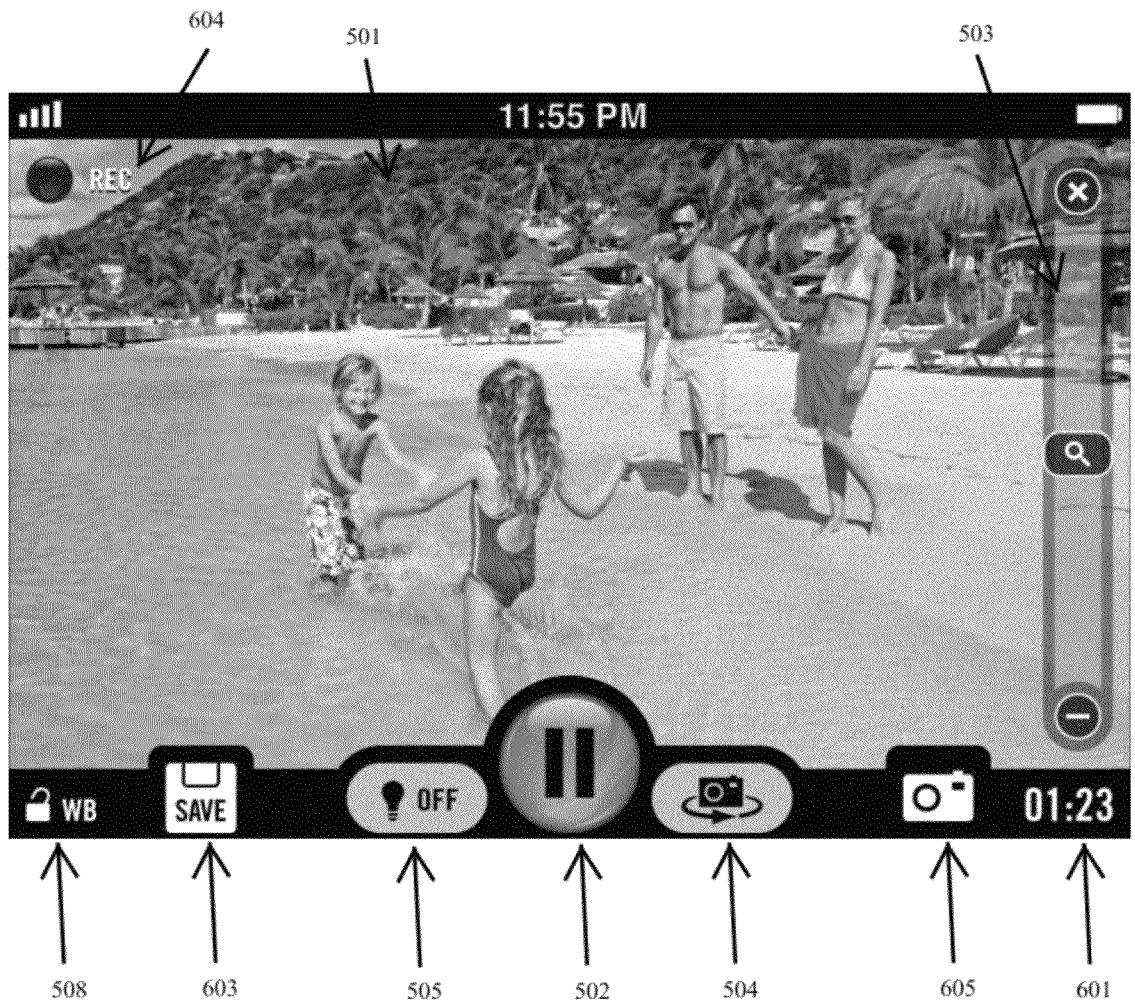

FIG. 22 is a perspective view of a display of a portable device during the recording of a video clip according to an alternate embodiment of the present invention.

Figure 23:
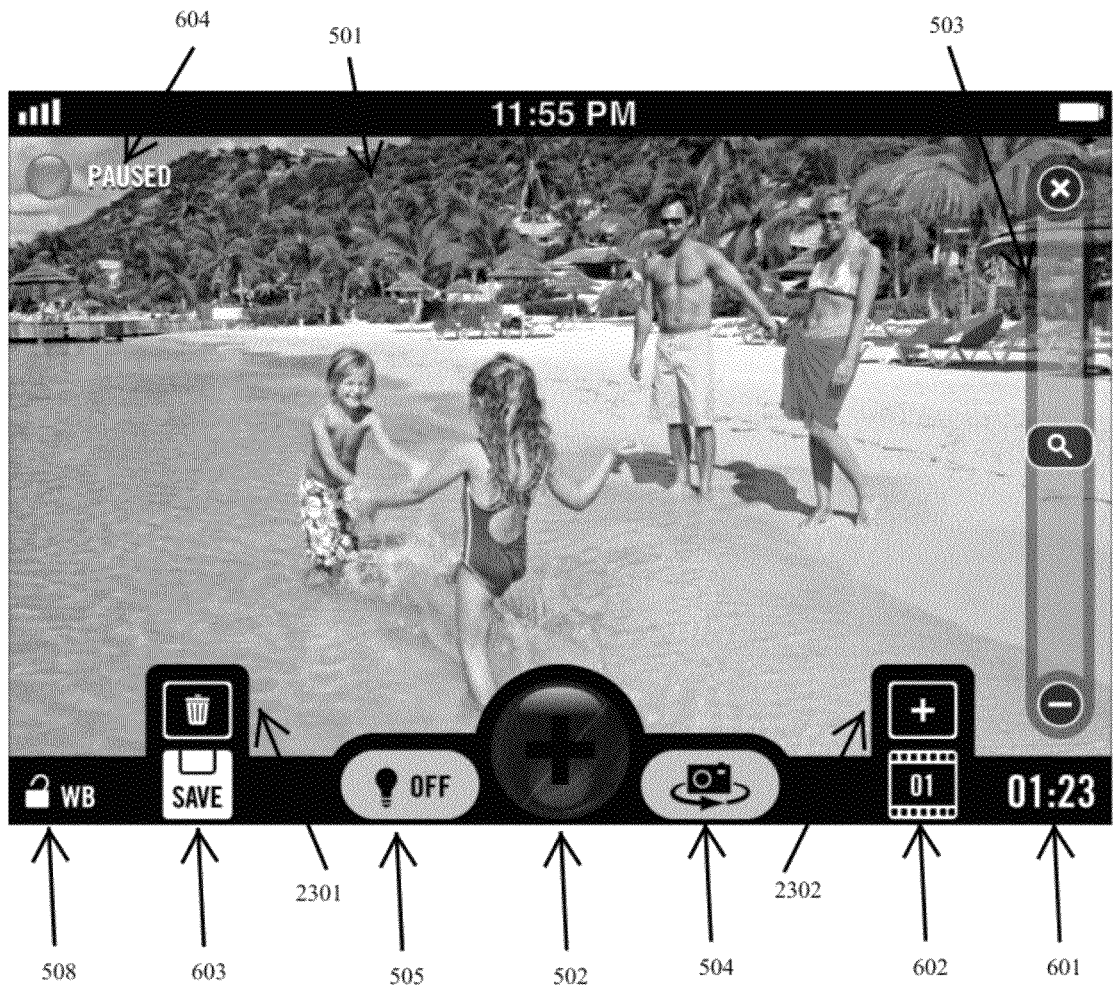

FIG. 23 is a perspective view of a display of a portable device after the recording of a video clip or photograph and the selection of a transition according to an alternate embodiment of the present invention.

Figure 24:
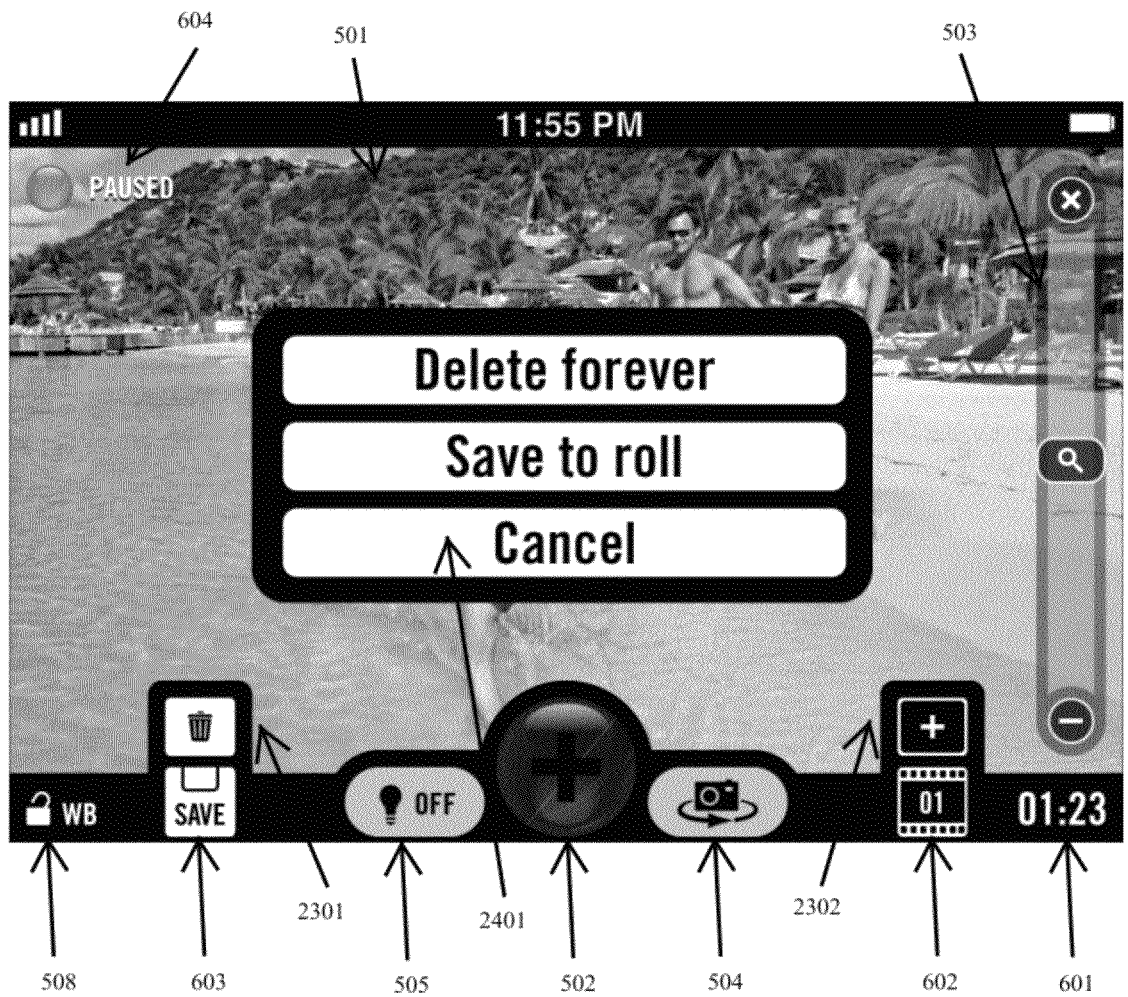

FIG. 24 is a perspective view of a display of a portable device after the delete button is operated according to an embodiment of the present invention.

Figure 25:
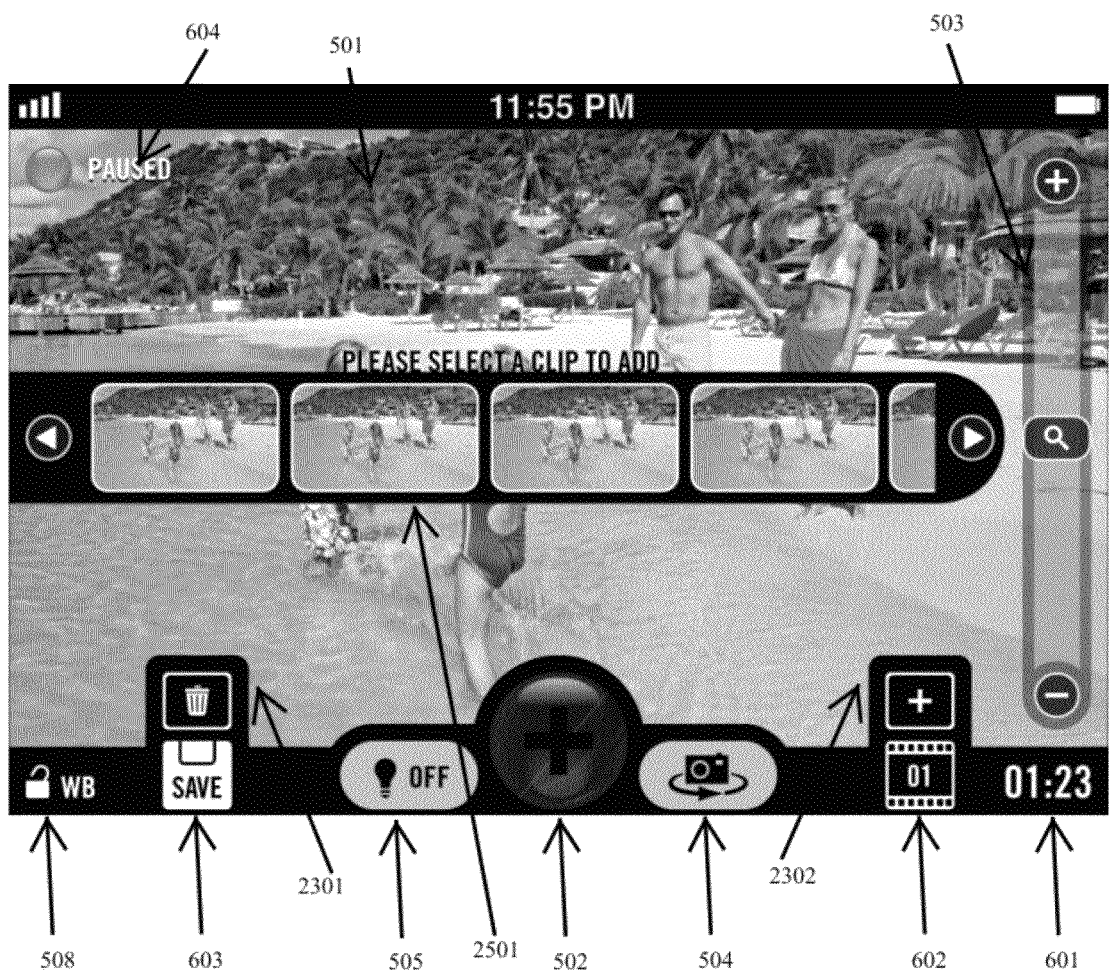

FIG. 25 is a perspective view of a display of a portable device with an add clip toolbar overlaid on the display of the portable device according to an embodiment of the present invention.

Figure 26:
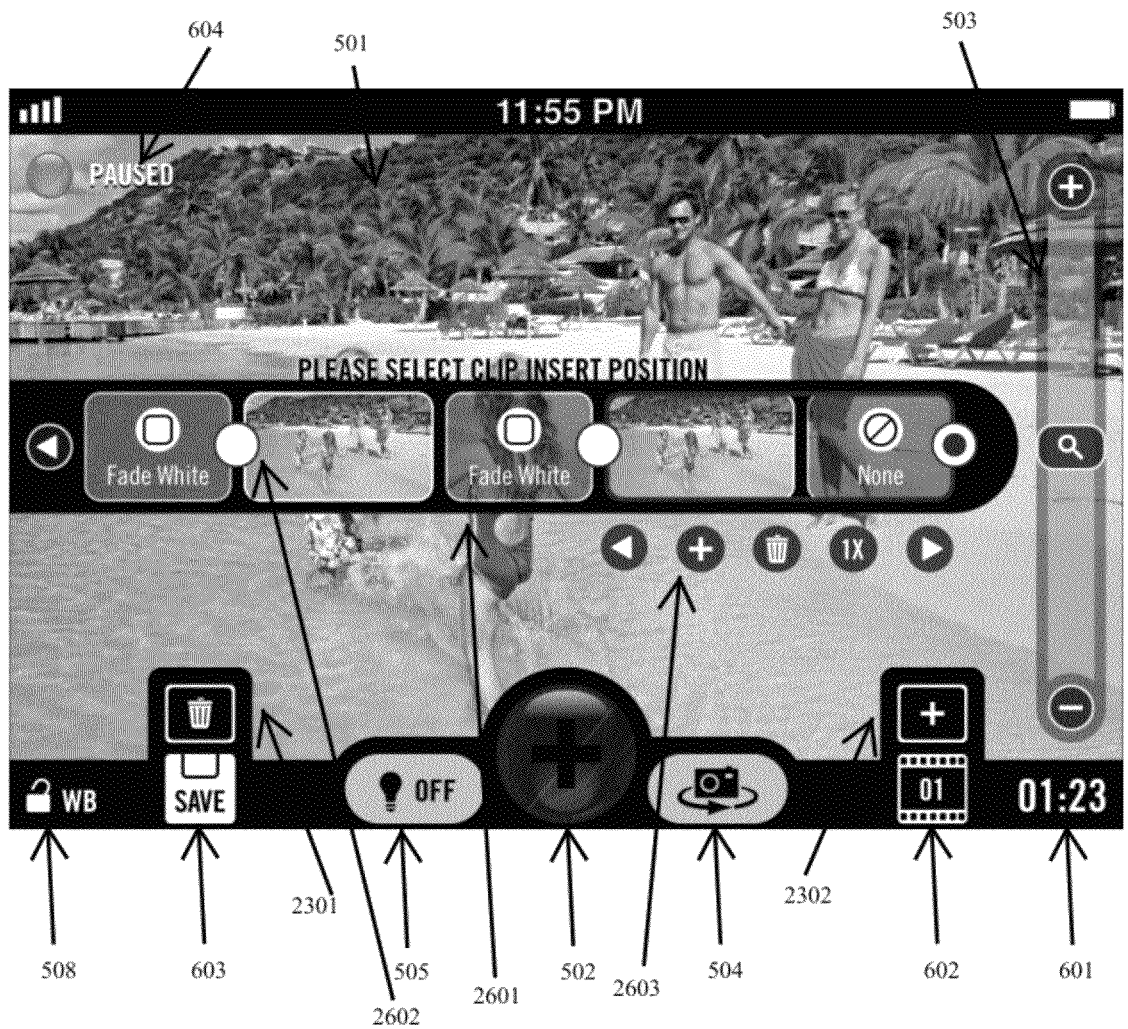

FIG. 26 is a perspective view of a display of a portable device after a user selects a media clip to add to the composition and with a clip insertion toolbar overlaid on the display of the portable device according to an embodiment of the present invention is illustrated.

Figure 27:
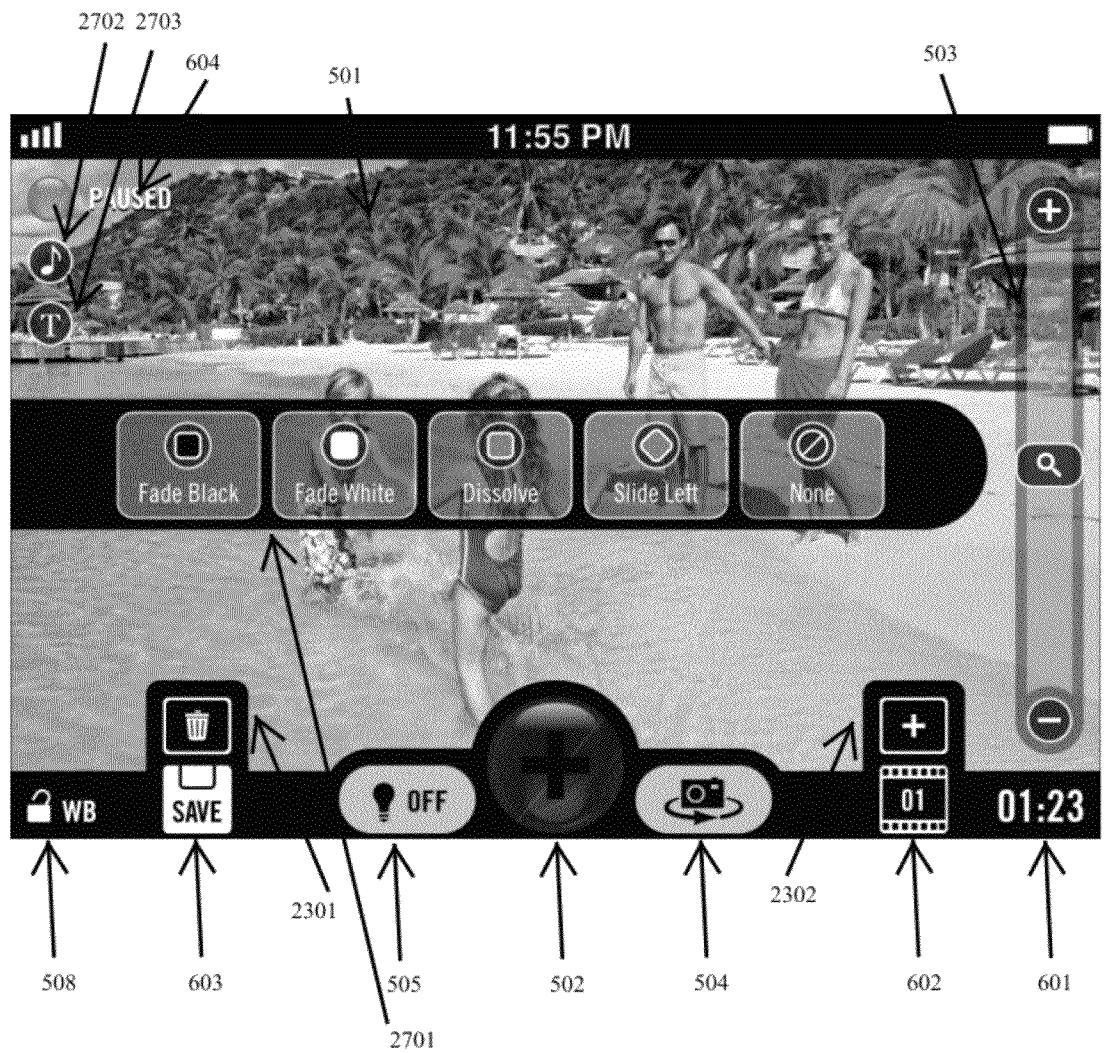

FIG. 27 is a perspective view of a display of a portable device with a transition toolbar overlaid on the display of the portable device according to one embodiment of the present invention is illustrated.

Figure 28:
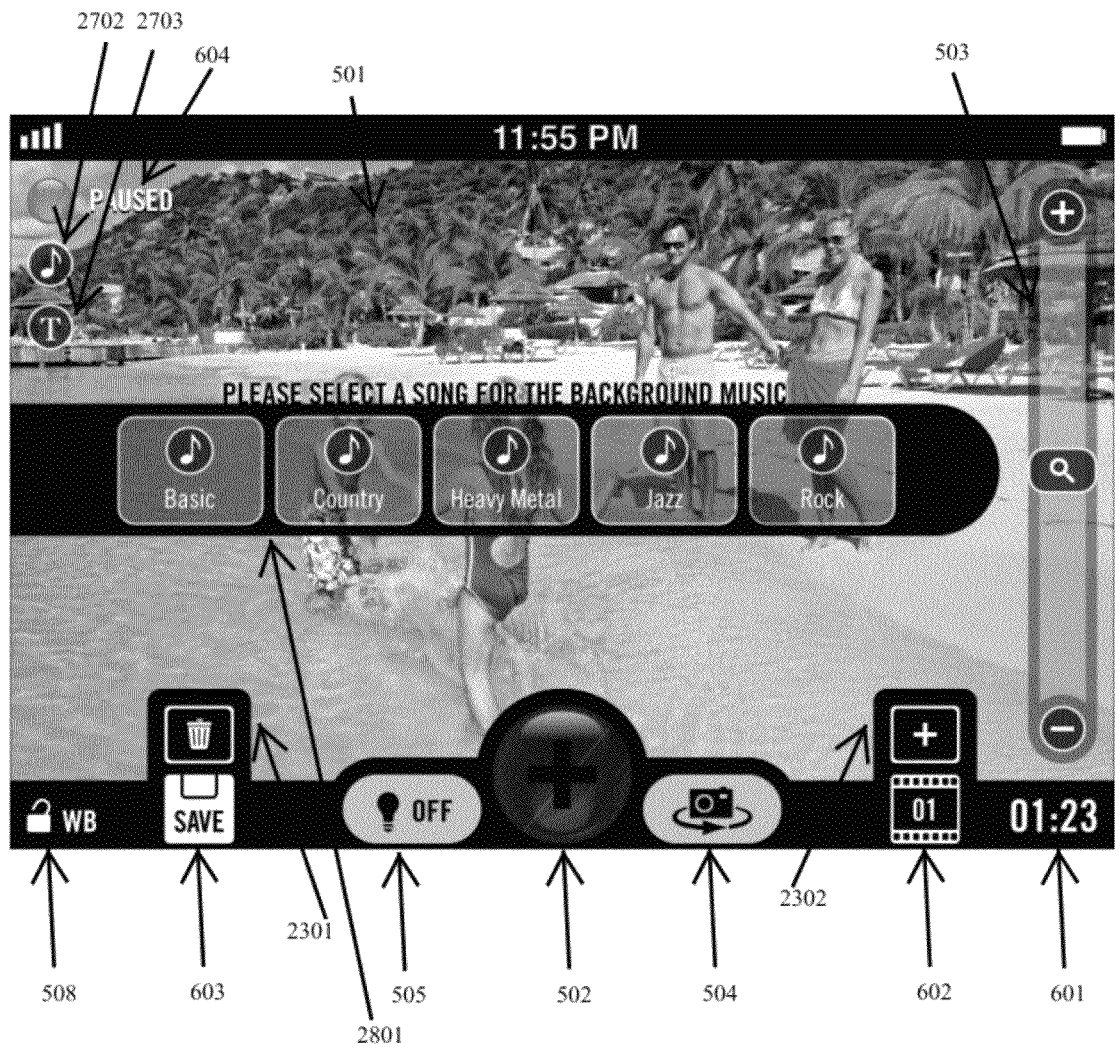

FIG. 28 is a perspective view of a display of a portable device after ah add music background button is operated according to one embodiment of the present invention is illustrated.

Figure 29:
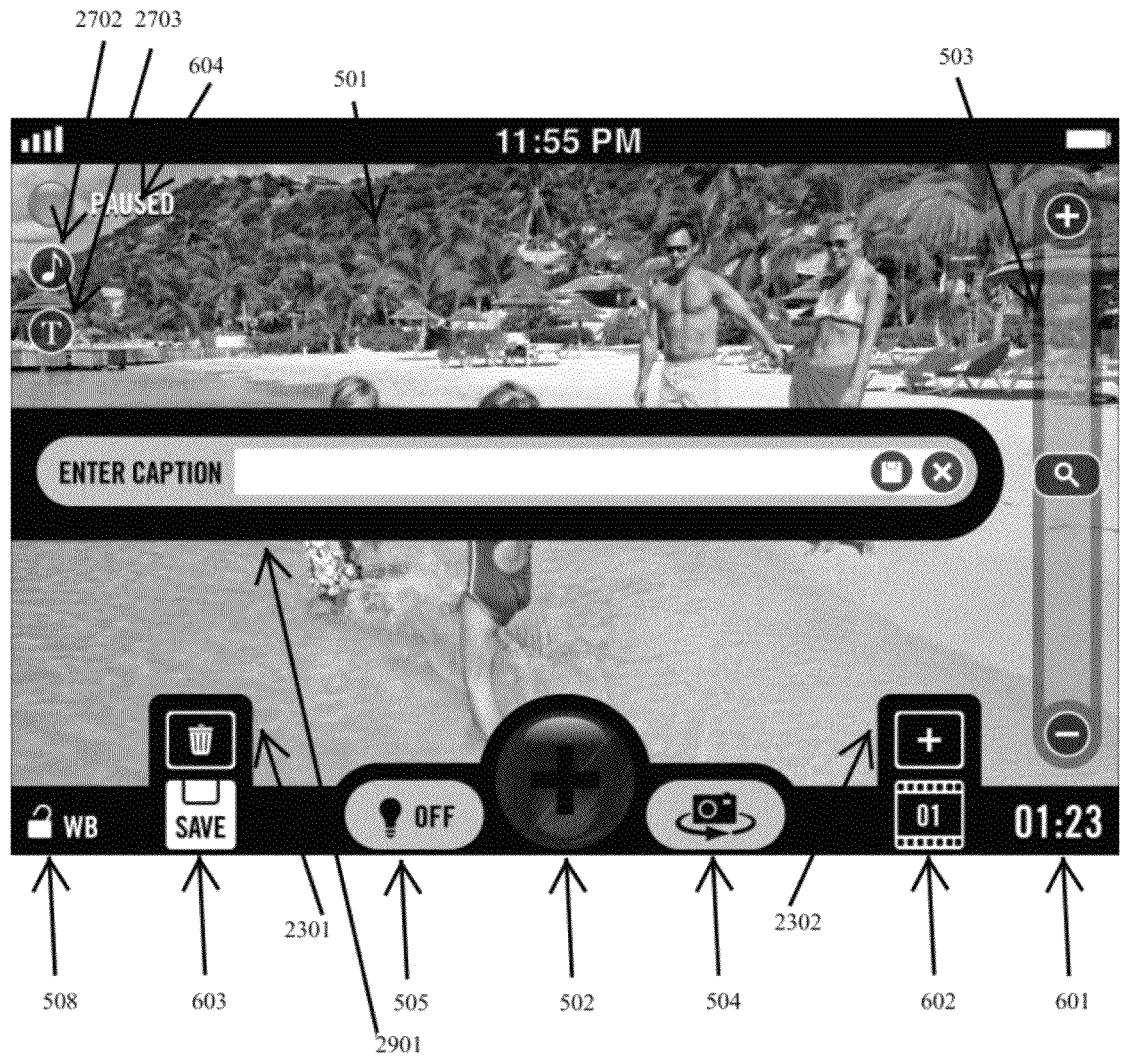

FIG. 29 is a perspective view of a display of a portable device after an add title/caption button is operated according to one embodiment of the present invention is illustrated.

DETAILED DESCRIPTION

The present invention relates to methods and apparatus for recording, editing and combining multiple video clips and photographs with transitions, music, titles and credits into a finished composition, while simultaneously having the capability to record additional video clips and/or photographs. The grouping of the multiple media segments (video clips or photographs) in combination with various effects is referred to herein as a "composition." However, it should be noted that the term "composition" as used herein may refer to slideshows, presentations, or productions that contain any combination of photographs and video clips with various effects, such as audio, music, transitions, filters, titles, captions, or credits. It should be noted that a composition may refer to a single video clip or photograph combined with a single effect, or may refer to any number of video clips, photographs and effects in combination. Stated simply, a composition is not limited to the number or type of media segments or effects included therein.

In one embodiment, the present invention is an application for a portable device, mobile communication device, camera or desktop computer. In one embodiment, the application is a video composition creation program. In the preferred embodiment, the portable device comprises at least one camera/camcorder visual input sensor or at least one audio input sensor. However, it should be noted that in alternate embodiments the portable device may not comprise a camera/camcorder, but rather remotely connects to another portable device that does comprise a camera/camcorder. The portable device or mobile communication device may be a smart phone or tablet, such as but not limited to, an iPhone® or an iPad® or a Blackberry®, Windows®, Mac OS®, bada® or Android® enabled device, that preferably but not necessarily comprises at least one camera/camcorder. In such embodiments, the present invention may be an application that can be purchased and downloaded to the portable device or mobile communication device by the user. As understood in the art, the download of the application may be done through a wired or wireless connection to the manufacturer's or service provider's application database. Thereafter, the present invention would reside on a computer readable medium located within the portable device, mobile communication device, desktop computer or mobile camera/camcorder.

Referring to FIG. 3, a representation of one example of a composition created the present invention is illustrated. The composition 300 of FIG. 3 comprises not only the desired video clips and/or photographs 301, but also includes a title 302, credits 303, transitions 304, and audio tracks 305 chosen by the user. The composition 300 of the present invention may include Video clips/photographs 301 as chosen by user. It should be understood that the composition 300 is simply one example of a composition in accordance with the present invention.

The transitions 304 are effects that are included between the various video clips and/or photographs of the composition 300. The transitions 304 are included to provide a pleasant visual, and sometimes audio, change from one video clip or photograph to another. It should be noted that although the transitions 304 illustrated in FIG. 3 are "fade black" transitions, various other transitions may be included, such as, for example fade white, dissolve, bubble transitions and spinning transitions. Further, it should be noted that, although permitted, there is no requirement that a transition be placed between each video clip and/or photograph in the composition.

The title 302 may include a video clip and/or photograph along with text providing the title, participants and/or the creators of the composition 300. The credits 303 may include the director, the location, and other information about the composition 300 the user would like to provide. As described in more detail below, the user may edit the colors and fonts of the text used in the title and credits of the composition created by the present invention.

The audio tracks 305 may be the audio recorded during the recording of the video clip or it may be background music added by the user. It should be noted that in some embodiments, the composition 300 may include both audio captured during the recording of the video clip along with background music added by the user. The background music may be a portion or the entire version of a song or other audio clip the user has stored on their portable device. Further, the audio tracks 305 can be set uniformly for the entire composition or different audio tracks 305 can be set specifically for each media segment of the composition. For example, if the portable device 400 is a smart phone that has both a camera and an audio player, the user may choose an audio track they have saved in the memory of their portable device and include it into the composition 300. In an alternate embodiment, if the present invention is a downloadable application, when the user downloads the application to their portable device a plurality of audio tracks may be included with the application for use in a composition. Therefore, the portable device 400 does not have to comprise an audio player.

Further, as discussed in more detail below, transitions, titles, audio tracks and other effects can be selected by the user upon the completion of the composition, can be selected by the user immediately subsequent to the recording of a single video clip or photograph, or can be automatically inserted into the composition without requiring user input.

Figure 4:
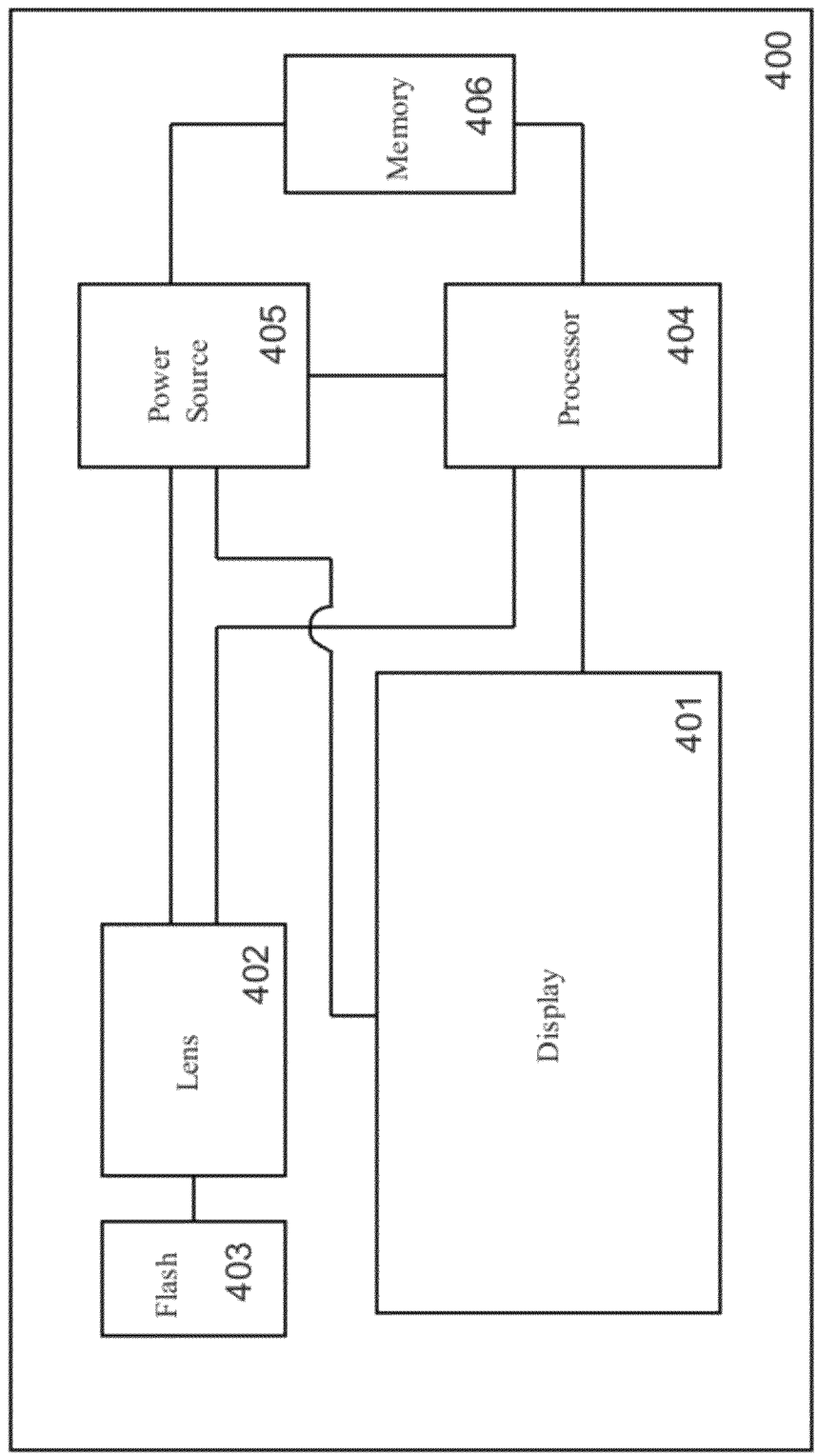
FIG. 4 is a schematic of a portable device according to one embodiment of the present invention.

Referring to FIG. 4, a schematic of a portable device 400 according to one embodiment of the present invention is illustrated. As noted above, the portable device 400 may be a mobile communication device such as a smart phone or tablet that comprises a camera/camcorder, whereby the user downloads the present invention as an application and stores the application on a computer readable medium located within the portable device 400. The portable device 400 comprises a display device 401, a lens 402, a flash 403, a processor 404, a power source 405, and memory 406. It should be noted that in some alternate embodiments, lens 402 and flash 403 may be omitted from the portable device 400. Further, as discussed in more detail below, the portable device 400 may comprise any number of lenses/402 or flashes 403.

In the preferred embodiment the portable device 400 is a mobile communication device such as a mobile phone, smart phone or tablet, such as but not limited to, an iPhone®, iPad®, Android®, Blackberry®, bada® or Windows® enabled device. The invention, however, is not so limited and the portable device 400 may also be a digital camera or camcorder that has the present invention stored in a computer readable medium therein, or a desktop computer that has an attached or embedded camera and the present invention stored in a computer readable medium therein. It should be noted that in alternate embodiments, the present invention may be stored on a computer readable medium within the portable device 400 prior to the user purchasing the portable device 400.

The processor 404 is configured to control the working of the display device 401, lens 402, flash 403, power source 405, and memory 406. The power source 405 is configured to provide power to the display device 401, lens 402, flash 403, processor 404 and memory 406. Memory is configured to store photographs and/or video clips recorded by the lens 402 of the portable device 400.

The lens 402 is a standard camera or camcorder lens that is configured to record video clips and photographs in response to a user input. In one embodiment, the portable device 400 of the present invention may include more than one lens 402. For example, in one embodiment, the portable device 400 may comprise a first lens on the front of the portable device 400 and a second lens on the back of the portable device 400.

The flash 403 is configured to provide light to the area being recorded by the lens 402. In one embodiment, where camera/camcorder of the portable device 400 comprises more than one lens 402, the portable device 400 may also include more than one flash 403, each flash 403 corresponding to a lens 402. However, it should be noted that the invention is not so limited and in alternate embodiments the flash 403 may be omitted.

The display device 401 is configured to display a view from the perspective of the lens 402 to enable the user to see the area of which they are taking a photograph or video clip. Stated another way, the display device 401 is configured to display an image of a real-world event perceived by the lens 402 of the portable device 400, prior to, during and after the recording of a video clip or photograph. In one embodiment, the display device 401 is a touch-screen that further comprises a graphical user interface (GUI) through the use of an on-screen touch interface configured to receive user inputted commands. In alternate embodiments, the portable device 400 may further comprise a seperate, mechanical user interface, such as, for example buttons, triggers, or scroll wheels.

As noted above, in the preferred embodiment, the present invention resides on a computer readable medium, within a mobile communication device such as a smart phone or tablet. In such embodiments, the portable device 400 may be configured such that if a video clip or photograph is being recorded and a composition being created when the user receives a phone call, text message, system alert, or simply needs to leave the application, the video clip, photograph and/or composition is automatically saved or cached in memory 406 so not to be lost.

In alternate embodiments, the portable device 400 may further comprise advanced features such as a global positioning system (GPS) chip, a compass, an accelerometer chip, a gyroscope chip, a thermometer chip, a temperature sensor, a facial detection system or service Application Programming Interface ("API"), a voice detection system or service API, a Speech-To-Text (STT) system or service API, a Text-To-Speech (TTS) system or service API, a translation system or service, a pixel-motion detection system or service, API, a music database system or service, a heart rate sensor, a near field communication (NFC) chip, a radio frequency identification (RFID) chip, an ambient light sensor, a motion sensor, an audio recording microphone, an altimeter chip, a Wi-Fi chip and/or a cellular chip. The present invention is further configured to monitor and save any data recored or obtained by any of the above mentioned chips, sensors, systems and components (collectively referred to hereinafter as "advanced features"). Further, the resulting data recorded or obtained by any of the advanced features may be saved as metadata and incorporated into recorded video clips, photographs or compositions created by the present invention. The incorporation of such data may be may be done in response to a user input or automatically assigned by the video composition creation program via a settings screen (discussed in more detail below in reference to FIGS. 19A-B). Examples of the functionality of the advanced features of the portable device 400 are discussed below. It should be understood that the descriptions below are examples and in no way limit the uses or the resulting data obtained via the advanced features in the present invention.

GPS coordinates, compass headings, accelerometer and gyroscope readings, temperature and altitude data may be recorded and saved into a recorded video clip, photograph or composition. For further example, an assisted GPS chip could be utilized within the functionality of the present invention to provide such things automatic captions or titles with location (Philadelphia, Pa.) by looking up GPS coordinates in a world city database on the fly. This could be especially useful with our remote camera or camera sharing feature (discussed in more detail below) and may allow users to record live video from cameras worldwide, whereby each recorded media segment could show the GPS coordinates or city. GPS could also be used to display running log of distance traveled from beginning of video to end of video of for example, current speed in miles per hour.

The digital compass chip could be utilized to optionally display (burn-in) to the video clip or composition the direction the camera is facing such as SW or NNE 280 degrees. Further, a compass chip could also be used along in combination with GPS, Gyroscope and a HUD (heads up display) to help a user replicate a video taken years prior at same exact location. For example, a user could take a video at same spot every month for two years and use the present invention to load older, previously recorded video clips and then add a newly recorded video clip taken at precisely the same location, direction and angle of view.

The axis gyroscope could be used for scientific applications along with accelerometer data and could be burned into a recorded video clip or composition for later analysis. Further, it also could be used to auto-stabilize shaky video clips or photographs recorded by the present invention. An altimeter could be used to burn in altitude information into a recorded media segment. This information could appear at end of the composition in the credits automatically or could be burned-in and adjusting real-time on a video clip or composition to show ascent or descent.

The temperature sensor could be used to automatically add temperature range to credits or to burn in on video. Further, a heart rate sensor could be used if a user wants heart rate information to be shown on a video clip, for example if the user is on a roller coaster.

The Facial Detection system or service API can be used to determine the number of unique persons in the video clip(s), their names and other related information if available locally on the device 400 or via the Internet. Information acquired via the facial detection system or service API may be used to automatically add captions, bubbles or applicable information on video clips, photographs, the title screen, the credits screen or any other portion of the finalized composition.

Similar to the Facial Detection system or service API, the Voice Detection system or service API can be used to determine the number of unique persons in the video clip(s), their identities or names and other related information if available locally on the device or via the Internet. Information acquired via the voice detection system or service API may be used to automatically add captions, bubbles or applicable information on video clips, photographs, the title screen, the credits screen or any other portion of the finalized composition.

The Speech-To-Text system or service API can be used to convert the spoken word portions of a recorded audio track of a video clip or the audio track of an audio recording into written text where possible for the purposes of automatically adding subtitles, closed-captioning or meta-data to a video clip or the final composition.

The Text-To-Speech system or service API can be used to convert textual data either gathered automatically, such as current time, weather, date and location, or inputted by the user, such as titles and credits, into spoken voice audio for the purposes of automatically adding this audio to a recorded video clip or the final composition. This may be used to assist the visually impaired or in combination with the Translation Service API to convert the text gathered from the Speech-To-Text service into spoken audio track in an alternate language.

The translation system or service API can be used for the purposes of automatically converting textual data either gathered automatically, such as current time, weather, date and location, or input by the user, such as titles and credits, into another language for localization or versioning when sharing over worldwide social networks or in combination with Speech-To-Text and Text-To-Speech to provide visual or audible translations of content.

A Pixel-Motion Detection system or service API can be used to determine the speed of movement either of the camera or the recording subject for the purposes of smoothing out camera motion for an individual recorded video clip or the final composition. Further, the Pixel-Motion Detection system or service API may also be used to automatically select a music background or sound FX audio based on the measured movement for an individual recorded video clip or the final composition. In one embodiment of the present invention, the Pixel-Motion Detection system of service API uses the beats per minute of a song to determine whether it matches the measured movement for a recorded video clip or final composition. In alternate embodiments, the determination of whether a song is "fast" or "slow" may be determined by the user.

A music database system or service API can be a locally or publicly accessible database of songs or tracks with information such as appropriate locations, seasons, times of day, genres and styles for the purposes of using known information about the video composition, and automatically selecting and incorporating a particular music track into a finalized composition based on the known information. For example, such a database might suggest a Holiday song on a snowy day in December in Colorado, USA or a Beach Boys song on a Sunny Day at the beach in San Diego USA. In one embodiment, the song would be automatically added to the composition to simplify user input. In alternate embodiments, the user has the ability to selectively choose the variables that determine which songs are to be incorporated into the finalized composition.

An NFC chip could be used to display on a media segment the information communicated by nearby NFC or RFID chips in products, signs or etc. An ambient light sensor could be used to adjust exposure or to add ambient light data to meta data for later color correction assistance in editing. A proximity sensor could be set somewhere on the face of the mobile device and is intended to detect when the phone is near a user's ear. This may be used to help control the present invention, for example, such as by allowing a user to put their finger over the sensor to zoom in instead of using touch screen or other user interface.

A Wi-Fi chip may be used for higher performance mobile devices and for live connection to the Internet for city lookups from GPS data and other information that may be desired in credits or as captions. The Wi-Fi chip could also be used for remote video or audio phone call and for those calls to be recorded live with permission as a part of the composition.

An audio recording microphone may be used to record audio, but could also be used to control the present invention. For example, the microphone could be used for certain functions, such as pause, resume and zoom via voice commands or to auto-trigger recording of next live clip in surveillance situations. If two microphones are used, they could be used to detect compass direction of a sound being recorded out of the camera lens's view.

A motion sensor could be used to actively control the application without human intervention and to auto-trigger the recording of a next live dip in surveillance situations. Further, a motion sensor could be used to change, the shutter speed in real-time to reduce motion blur on a recorded media segment.

In other alternate embodiments, the portable device 400 may comprise a three-dimensional (3D) dual-lens camera. In such embodiments, the present invention is further configured to record 3D video clips and photographs, and include metadata that comprises depth information obtained from one of the above mentioned advacned features into a finalized composition.

Various screen shots of the display device 401 will now be described in reference to FIGS. 5-21. It should be understood the description of the display device 401 in FIGS. 5-21 is just one example of a display that may be used in accordance with the present invention.

The first step of creating a composition 300 is to begin a recording session, in one embodiment, a recording session begins when the user initiates the present invention, the present invention being an application or program residing on the memory of the portable device 400. The initiation of the present invention may be starting the present invention and choosing an option to initiate a recording session, or simply powering the portable device 400 that comprises the present invention. After the user begins a recording session, the display device 401 of the portable device displays an image of a real-world event perceived by the lens 402 of the portable device 400, thereby enabling the user to see what the video clip or photograph will look like if and when recorded.

Figure 5:
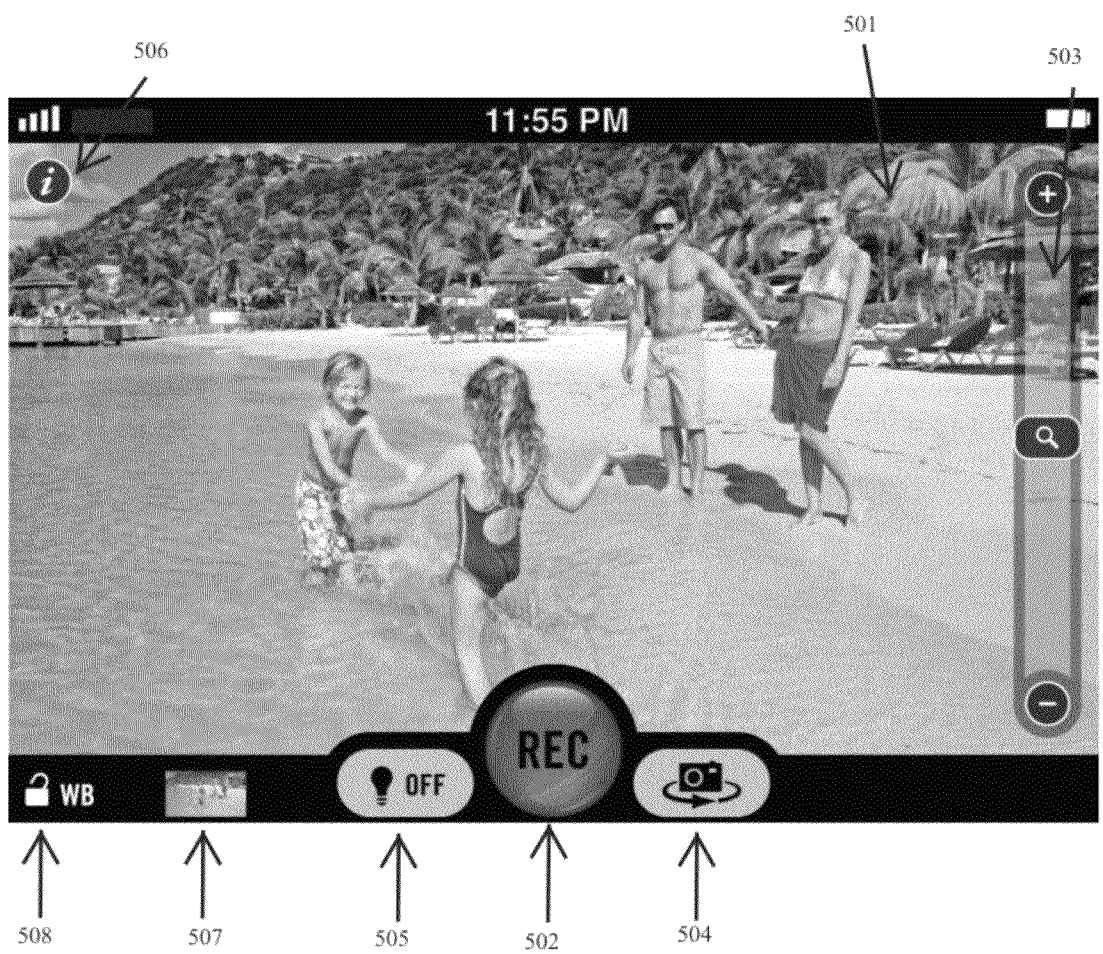
FIG. 5 is a perspective view of a display of a portable device when no photograph or video clip is being recorded according to one embodiment of the present invention.

Referring to FIG. 5, a perspective view of the display device 401 according to one embodiment of the present invention is illustrated. The display device 401 of FIG. 5 comprises a main display 501, an action button 502, zoom bar 503, a switch lens button 504, a flash button 505, a preference button 506, a library button 507, and a white balance toggle 508.

In the preferred embodiment of the present invention, when the user is creating a composition 300, for example recording video clips and/or photographs and adding effects such as transitions in-between media segments as noted above, the main display 501 is be configured to always display an image of a real-world even perceived by the lens 402, thereby enabling the user to record a video clip or photograph while simultaneously creating the composition 300. Therefore, the user does not potentially miss a moment they would like to capture with a video clip or photograph while they are adding transitions or other effects to the composition 300.

Referring to FIG. 5, the action button 502 is configured to allow the user to switch between multiple states of the portable device 400, such as, for example "record," "pause" and "add video." FIG. 5 illustrates the display device 401 at the beginning a recoding session. As shown, the action button 502 is in a "record" state where the user may begin the process of recording video clips and still photographs so to dynamically create a composition. If a user operates the action button 502 when it is in the "record" state, the portable device 400 begins recording a video clip, to thereby delimit the beginning of the video clip. The video clip is a recording of a first real-world event perceived by the lens 402 of the portable device 400.

Figure 6:
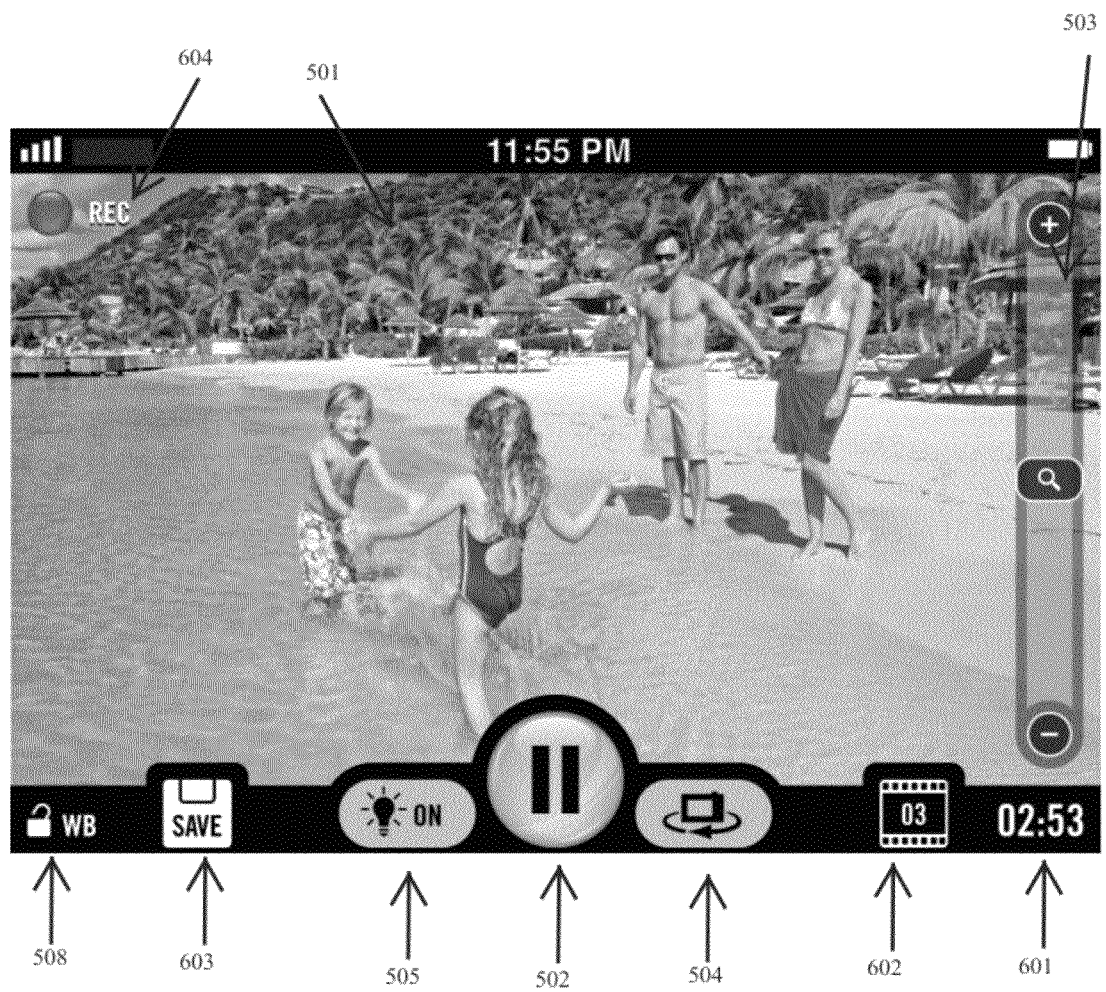
FIG. 6 is a perspective view of a display of a portable device during recording of a video clip according to one embodiment of the present invention.
Figure 7:
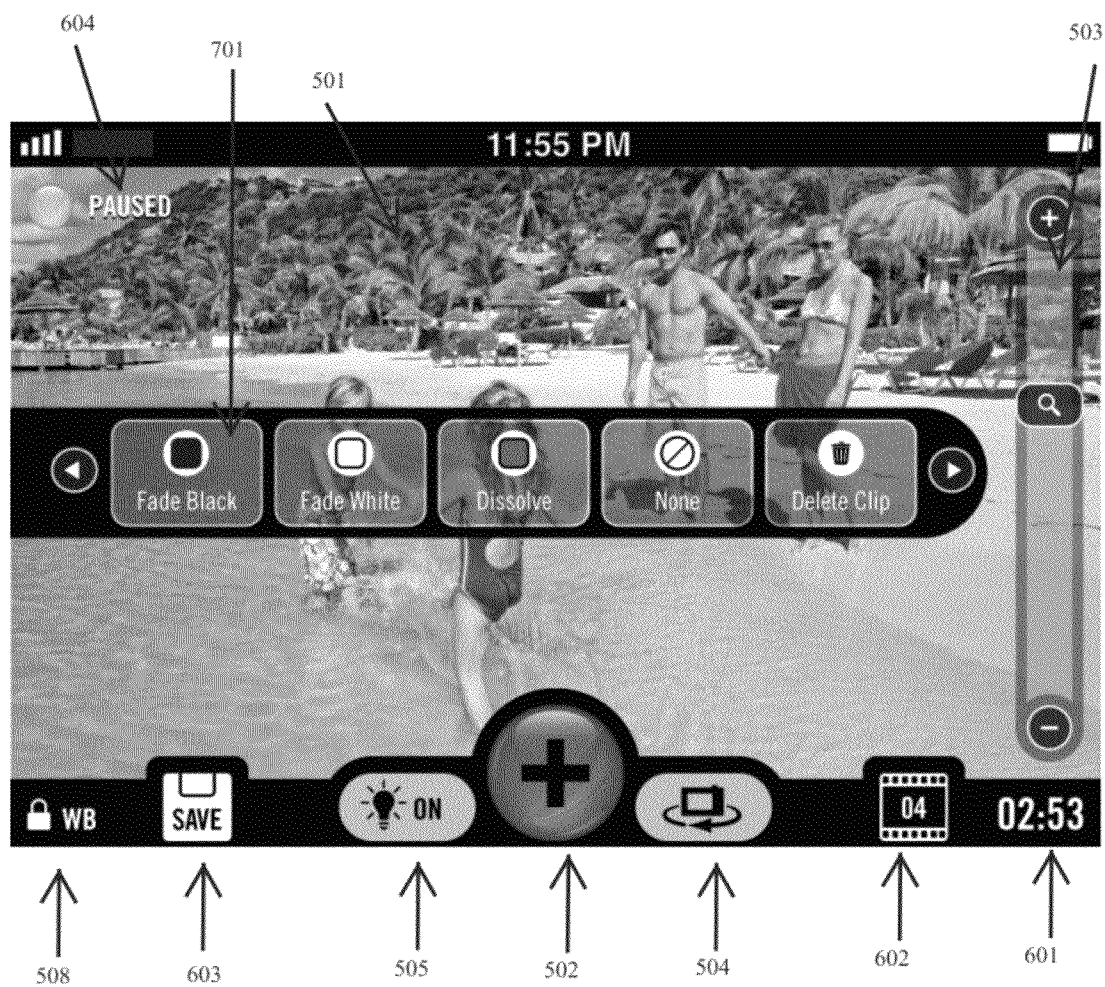
FIG. 7 is a perspective view of a display of a portable device after a photograph or video clip is recorded and before the user has chosen a transition and/or deleted the photograph or video clip according to one embodiment of the present invention.

After the user initiates the "record" state, the action button 502 switches to the "pause" state (as shown in FIG. 6). If the user is currently recording a video clip and operates the action button 502 when it is in the "pause" state, the video clip is paused and that particular video clip is saved in memory 406. Therefore, operating the action button 502 when it is in the "pause" state, delimits the ending of the video clip w/o concluding the recording session. Once the user operates the action button 502 when it is in the "pause" state, the recording of the video clip is concluded, the recorded video clip is added to the composition 300, and the action button 502 switches to the "add video" state. Further, as discussed in more detail below, a transition toolbar 701 may be overlaid over the main display 501 of the display device 401 (as shown in FIG. 7).

Figure 8:
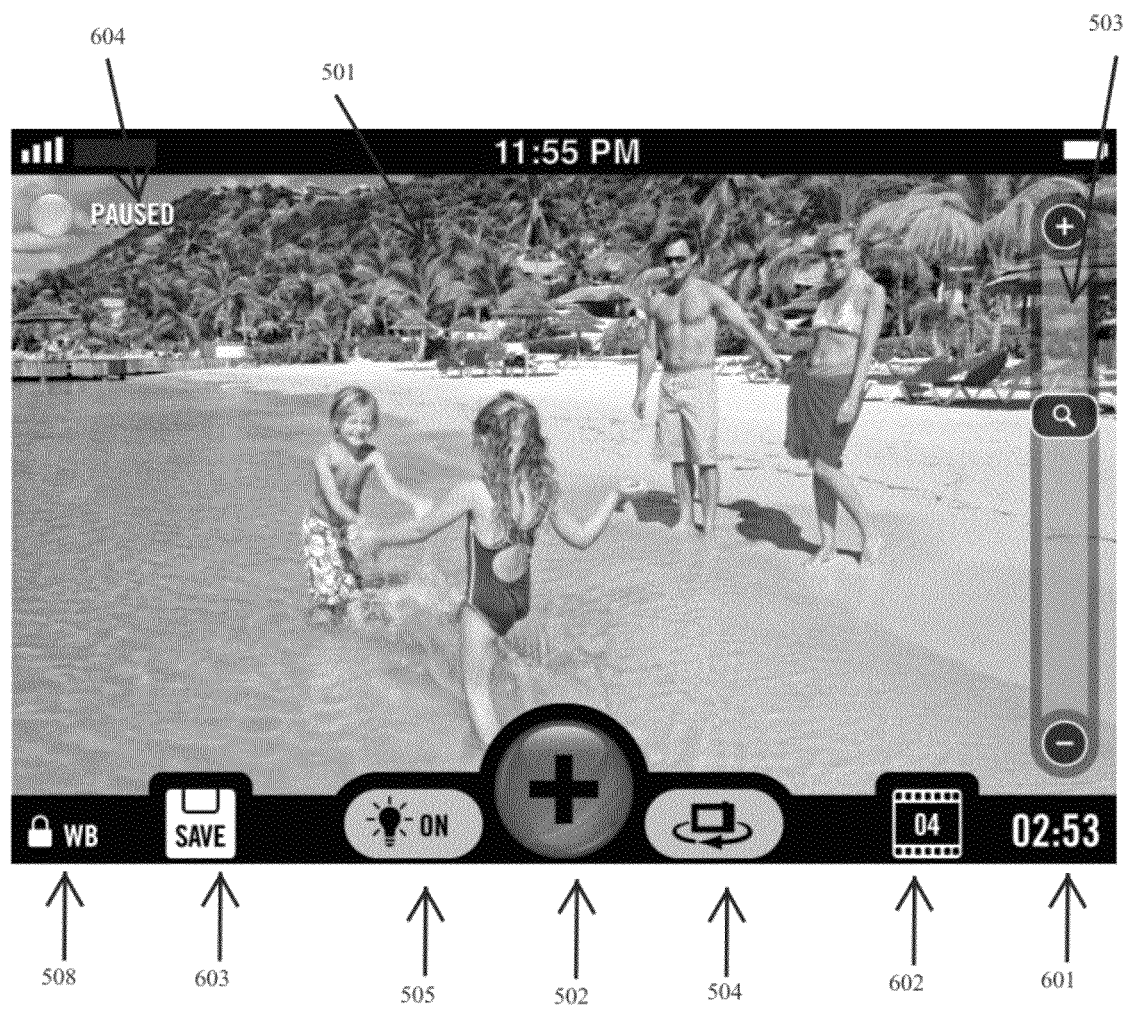
FIG. 8 is a perspective view of a display of a portable device after a photograph or video clip is recorded but while the composition is still in progress according to one embodiment of the present invention.

Thereafter, if the user operates, the action button 502 when it is in the "add video" state, the recording of a second real-world event by the lens 402 of the portable device 400 commences (as shown in FIG. 8), and the action button 502 switches back to the "pause" state. Subsequently, if the user continues to record additional video clips, the action button 502 will continue to switch between the "pause" state and the "add media" state until the user decides to conclude the recording session and save the composition. Similar to operating the action button 502 when it is in the "record" state, operating the action button 502 when it is in the "add media" state delimits the beginning of a video clip to enable additional video clips to be recorded and included into the composition during the single recording session. The additional video clip is a recording of a second real-world event perceived by the lens 402 of the portable device 400. It should be noted that the second real-world event can be a subsequent temporal portion of the first real-world event, or it can be another different real-world event. Further, as discussed in more detail below, both the first and second real-world events may be perceived by one single lens of the portable device 400, multiple different lenses of the portable device 400, or by lenses of a secondary device.

The above mentioned process may be repeated to record any number of real-world events during a single recording session. As discussed in more detail below, a recording session may be concluded when the user operates the save button 603. The invention however is not so limited and in alternate embodiments, the action button 502 may be configured to allow the user to switch between other states, such as, for example, rewind and slow motion.

In embodiments where the portable device 400 comprises more than one lens 402, the switch lens button 504 is configured to enable the user to switch between lenses prior to taking a photograph or recording a video clip. When the switch lens button 504 is operated, the main display 501 is switched between images of real-world events perceived by the each lens 402 of the portable device 400. Therefore, the switch lens button 504 is configured to change the image displayed on the main display 501 from an image perceived by one lens to an image perceived by another lens. It should be noted that in alternate embodiments of the present invention, the lens button 504 may be used while recording a video clip and may provide the user with a mechanism to record successively or simultaneously from more than one lens 402 without having to end or pause the recording of a single video clip. It should be noted that there is no limit to the number of lenses that may be configured for use with the present invention. Further, as discussed in detail below with reference to FIG. 22, the lenses configured for use with the present invention do not have to reside on the same portable device 400.

The zoom bar 503 is configured to allow the user to zoom the lens 402 away from or towards a real-world event. If the user taps the "+" sign at the top of the zoom bar 503, the camera lens 402 will zoom towards the real-world event being recorded, thereby enabling the user to get a closer perspective of the real-world event being recorded. If the user taps the "−" sign at the bottom of the zoom bar 503, the camera lens 402 is configured to zoom away from the real-world event being recorded, thereby enabling the user to record a larger portion of the real-world event being recorded.

The flash button 505 is configured to allow the user to turn the flash 403 on or off while either taking a photograph or recording a video clip. Further, the flash button 505 may also be configured to allow the user to switch the flash into a strobe mode. A strobe mode is where the flash is alternating between an "on" state and an "off" state to create the effect of a strobe light.

As discussed in more detail below, the library button 507 is configured to allow the user to view their library of video clips, photographs, and compositions. The white balance toggle 508 is configured to allow the user to switch between white balance lock and white balance unlock. Although white balance is shown herein, the invention is not so limited and alternate embodiments, the balance toggle 508 may be configured to allow the user to switch between any color balance adjustments.

The preference button 506 is configured to provide the user with a variety of settings and user preferences. Referring to FIG. 20, one example of a list of settings according to an embodiment of the present invention is illustrated. As shown in FIG. 20, the user may have the option to add grid lines to the main display 501, to save the individual video clips and/or photographs to memory 406, to allow for a flash "strobe mode," to date and time stamp the individual video clips and/or photographs, and to adjust the camera's resolution. As shown in FIG. 20, the preference button 506 allows the user to decide whether all photographs and video clips are saved as individual files in memory 406 or whether just the entire finalized composition is saved as an individual file in memory 406. In the preferred embodiment, the portable device 400 is configured so that only the entire finalized composition is saved as an individual file in memory 406. Therefore, the individual video clips and photographs are not saved in memory 406, thereby preventing the user's library from becoming overly cluttered with media. However, if the user so chooses, the user may select an option by selecting the preference button 506 to save both the individual video clips along with the entire finalizing composition in memory 406. The invention is not so limited and in alternate embodiments other options that provide for greater camera/camcorder customization and flexibility may be included.

In one embodiment, the preference button 506 allows the user to switch between multiple recording modes. It should be noted that the invention is not so limited, and in alternate embodiments the recording mode may be pre-set. A recording mode is a pre-configured mode that has preset options or effects, such as preset transitions, title, credits, music, and/or whether photographs and/or video clips may be incorporated into the composition. A recording mode may be selected prior to beginning a recording session, a recording mode may be selected during a recording session and during the creation of a composition, or a recording mode may be selected after a composition has been created. A recording mode enables the user to select a pre-configured arrangement of options or effects, thereby reducing user input during the creation of the composition. Further, if the recording mode is: changed during the recording session, every part of the composition prior to and after the change will be adjusted accordingly. Therefore, the present invention allows for the automatic creation of a composition without the need for the user to end or pause their recording session or exit the live action display of a real-world image on the display device 401. For example, the user may choose a recording mode that has a preset transition to be inserted between each recorded video clip of a composition, thereby allowing for the dynamic creation of a composition.

For further example, one recording mode may be a "professional" recording mode, whereby a specific transition is automatically inserted between video clips, a title and credits are inserted upon user input, but music or audio is not included. For further example, the default recording mode may be a "user custom" recording mode, whereby the user is prompted to select and configure all the available options and effects, including transition types, title, credits and music prior to beginning a single recording session. Thereafter, if the user begins a recording session and selects the "user custom" recording mode, when the user has recording multiple video clips and/or photographs and completed the recording session, the preconfigured options and effects of the "user custom" recording session will be automatically incorporated into the composition. It should be noted that the invention is not limited in the number or type of recording modes having any combination of options and/or effects may be included.

Further, in an alternate embodiment, a recording-mode may be pre-set such that any combination of various effects (audio, music, transitions, filters, titles, captions, or credits) and/or data recorded or obtained from the advanced features (e.g., GPS chip, compass, accelerometer chip, gyroscope chip, thermometer chip, temperature sensor, facial detection API, pixel motion detection API, voice detection API, Speech-To-Text API, Text-To-Speech API, music database API, translation API, heart rate sensor, NFC chip, RFID chip, ambient light sensor, motion sensor, audio recording microphone, altimeter chip, Wi-Fi chip and/or cellular chip) may be automatically incorporated into the composition either at random or in response to computer detectable information. Computer detectable information may include the current date, time, or location of the portable device 400 or the facial detection, voice detection, etc. of an individual that is captured in a recorded media segment (video clip or photograph) of the composition.

For example, in one embodiment of the invention, the date may be automatically set as the title of a composition upon its creation without any additional user input required. For further example, in another embodiment of the present invention, music can be incorporated into a composition based on the time of year or the user's location without requiring user input. Moreover, in yet another embodiment, the voice of a specific individual recorded in a video clip may be automatically translated to a different language and subtitles may be incorporated into the composition during the play-back of that particular video clip. It should be understood that the preceding examples are for explanation purposes only and in no way limited the scope of the present invention. The pre-set recording modes of the present invention may be configured such that any particular combination of effects or data may be automatically incorporated into a composition without the requirement of additional user input. In the pre-set recording modes, the user simply records a video clip or photograph and the present invention automatically incorporates the content or data into a final composition without the requirement of additional user input.

Figure 17:
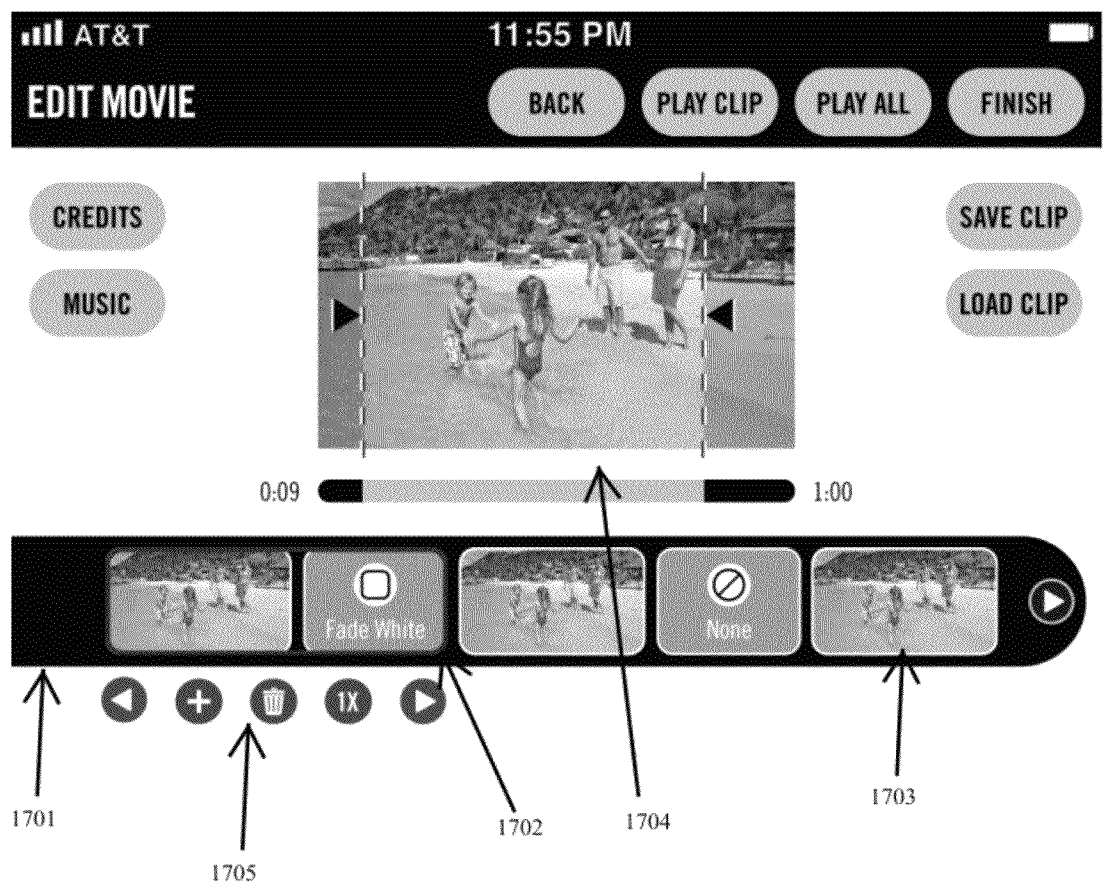
FIG. 17 is a perspective view of an edit composition screen according to one embodiment of the present invention.

In another embodiment, the preference button 506 is configured to allow the user to edit the composition. Referring to FIG. 17, one example of an edit screen of the present invention. As shown, the composition may be fully editable on a timeline 1701 that shows thumbnails for titles (hot shown), transitions 1702, video clips 1703, photographs (not shown), credits (not shown) and visual representations of audio tracks (not shown). The user may edit each video clip, photograph, transition and other segment (title, credits, music, etc.) of a composition using an edit toolbar 1705. After a user selects an individual media segment or effect on the timeline 1701, the user may then choose the course of action they desire using the edit toolbar 1705. For example, the user may move the media segment or effect to a different position in the timeline 1701 using the arrows of the edit toolbar 1705, delete the media segment or effect using the trashcan of the edit toolbar 1705, duplicate a media segment of effect using the "+" sign of the edit toolbar 1705, adjust the speed of the media segment or effect during the playback of the composition using the "1X" button of the edit toolbar, or edit the video clip or effect using the edit clip screen 1704 displayed above the timeline 1701. The user may choose to duplicate a media clip for repeating effects or to show a beginning of a video clip at one point and the end of that Video clip at another point during the composition. Further, the user may adjust the speed of the media segment or effect to a faster or slower speed, whereby each time the user operates the "1X" button of the edit toolbar 1705, the button changes to the new speed of the media segment or effect (e.g. 2X, 4X, ¼X, ½X, or 1X). If the user chooses to edit the media segment, the selected media segment is presented to the user in the edit clip screen 1704 for further editing. In the edit clip screen 1704, the user may edit the media segment by cropping the size of the video clip or shortening its duration. In an alternate embodiment, selecting a video clip/photograph thumbnail allows the user to delete or tap-drag the video clip/photograph to another position in the composition. Similar editing features are available for all the clips and segments of a composition in the edit screen when they are selected.

As discussed in more detail below, in alternate embodiments Of the present invention the user may edit the compositions without having to leave the main display 501. Therefore, the user may edit their composition while continuously viewing live events as perceived by a lens on the display device 401. Further, in other alternate embodiments, an editing toolbar may be overlaid over the main display 501 of the display device 401 that enables additional media segments (video clips and photographs) to be inserted into the composition during the creation of the composition, those media segments being previously recorded using the present invention, thereby enabling a non-linear composition creation method.

For example, in one embodiment the edit screen is further configured to allow a user to select a title or credits screen and edit the text, change fonts, colors or title/credits styles. Selecting an audio track allows the user to change the relative volume, or in the case of background music, pick a different music track from the library on the portable device 400. After editing is complete, the user may, review undo changes or save the entire edited composition to the memory 406 of the portable device 400. It should be rioted that the invention is not so limited, and in alternate embodiments other methods of editing the composition may be used.

Further, the preference button 506 may also be configured to enable the user to select if the user wants the photographs included into the composition as a framed photo, if the user only wants those photographs saved on the memory 406, or both. In one embodiment, the preference button 506 is also configured to enable the user to select the flash settings, the shutter-sound effects and other photograph effects, such as sepia, black and white, color contrast, picture modes, etc., they desire while taking the photographs.

Referring to FIG. 6, a perspective view of the display device 401 during the recording of a video clip according to one embodiment of the present invention is illustrated. Similar to FIG. 5, the display device 401 of FIG. 6 comprises a main display 501, an action button 502, zoom bar 503, a switch lens button 504, a flash button 505, and a preference button 506. However, the display device 401 of FIG. 6 further comprises a composition duration indicator 601, a media segment number indicator 602, a save button 603, and a current state indicator 604.

It should be noted that since FIG. 6 illustrates the display device 401 during the recording of a video clip, action button 502 is in the "pause" state. It should be further noted that the main display 501 displays an image of a real-world event perceived by the lens 402 of the portable, device 400, thereby enabling the user to see what they are recording. As noted above, if a user operates the action button 502 when it is in the "pause" statesmen the recording of the video clip will be paused and the recorded video clip will be stored in memory 406. However, the recording session will continue and the main display 501 will continue to display an image of a real-world event perceived by the lens 402 of the portable device. Thereafter, the user may seamlessly include effects, such as a transition, while still viewing live action through the main display 501, thereby ensuring the user is continuously able to record any additional media segment they may desire while creating the composition (an example shown in FIG. 7). Further, upon the user operating the action button 502 when it is in the "pause" state, the action button will switch to an "add media" state (as shown in FIG. 7), thereby enabling the user to add additional video clips or other media segments to their composition without having to conclude the recording session.

The composition duration indicator 601 provides the user with the current duration of the entire composition being recorded in minutes and seconds. This may or may not be set to include the transitions, title, credits and other effects the user has included in their composition. In should be noted that the invention is not so limited and in alternate embodiments the composition duration indicator 601 section may display the length of the entire composition being recorded in any other suitable format. Further, in alternate embodiments, the composition duration indicator 601 may also display the length of the individual video clip currently being recorded.

The media segment number indicator 602 of the display 401 provides the user with the segment number of the media currently being recorded for the specific composition being created. For example, if the media segment number indicator 602 is set to "2," then the video clip currently being recorded is the second segment of media in the composition being created. The media may be either photographs and/or video clips. The media segment indicator would only count photographs if the user preference was set to include still photographs in the final composition, it should be noted that in alternate embodiments, the media segment number indicator 602 may be configured to display the segment number of the media already recorded for the composition, not including the media currently being recorded, or the total number of segments in the composition, including transitions, titles, credits along with the video clips and photographs.

Further, the media segment number indicator 602 may also be configured to initiate the taking of a photograph. Therefore, if the user wants to take a photograph, the user may simply operate the media segment number indicator 602 and a photograph will be taken by the portable device 400. It should be noted that the user may take a photograph while they are recoding a video clip, prior to recording any video clips, or when the composition is paused. Further, in alternate embodiments, there may be a separate button that is configured to take a photograph or provide the user with photograph options.

The save button 603 is configured to save the current media segment (either photograph or video clip) to memory 406, end the composition being created, thereby ending the recording session and provide the user with an options menu. Therefore, the save button 603 is configured to end and save the entire composition, which may contain one or more photographs and/or video clips, and end the entire recording session. However, the invention is not so limited and in alternate embodiments the save button 603 may be configured to initiate a series of options screens prior to concluding the recording session. Further in other embodiments the save button 603 may be configured to save, the current media, segment in memory 406 and not automatically end the composition being created or end the recording session, but rather provide the user with an option to end the recording session.

It should be noted that the present invention saves or in some cases, caches the composition at various states during the recording session. Therefore, if a user is interrupted while creating the composition, for example if the user receives a phone call on the portable device 400, the composition is automatically saved. Thereafter, the user may return to the composition without having lost any video clips or photographs. In one embodiment, all the media files and the composition are saved temporarily until the composition is complete and the recording session concluded, whereby the media files and/or the composition will be saved permanently in the memory 406 of the portable device 400.

The current state indicator 604 indicates to the user the current state of the present invention. For example, the current state may be "paused" or "recording." As illustrated in FIG. 6, the current state indicator 604 indicates that a video clip is being recorded. However, after the action button 502 is operated and the recording of the video clip concluded, the action button 502 switches to "paused" to indicate that the video clip has been saved and that the recording session is paused (as shown in FIG. 7). Thereafter, if the user operates the action button, which is in the "add media" state, then the current state indicator 604 will return to the "recording" state to indicate that a subsequent video clip is being recorded. The invention is not so limited, and in alternate embodiments the current state may be any other state applicable to a camera or camcorder.

Referring to FIG. 7, after completing the recoding of a single video clip or photograph, a transition toolbar 701 is displayed over the main display 501. The transition toolbar 701 is configured to allow the user to seamlessly select a transition to come after the Video clip or photograph in the composition, immediately after the user concludes the actual recording the video clip or photograph. Further, the transition toolbar 701 is also configured to allow the user to delete the current video clip or photograph from the composition. Since the transition toolbar 701 is overlaid over the main display 501, the user does not have to leave a view Of the live action and miss any potential moments they may want to record. simply stated, the transition toolbar 701 is provided during the recording session, thereby providing the minimal interruption the user while they are creating a composition. Immediately after the user records a media segment, the transition toolbar 701 is overlaid on the main display 501, and the user may decide whether to include a transition or delete the media segment. Further, even if the transition toolbar 701 is displayed on the main display 501, at any time the user may operate the action button 502, which is in the "add media" state, and record another additional video clip segment. If the user begins the recording of an additional media segment, the transition toolbar 701 is removed from the main display 501. In such an instance, the present invention may be configured to automatically include a default transition between the media segments, or forgo the inclusion of a transition between the two media segments (in which case a user may later include a transition by entering the options menu during or after the recording session). Since the main display 501 continuously displays an image of a real-world event perceived by the lens 402 of the portable device 400, there is a reduced chance that the user misses a moment they would like to record. Therefore, the user is does not have to leave the present invention to create a composition, nor does the user ever have to leave a view of the live action when creating a composition using the present invention. Simply stated, transitions and other effects may be included into the composition during the single recording session. It should be noted that in embodiments where a recording mode is selected that automatically inserts transitions, the transition toolbar 701 may be omitted and the main display 501 will continuously display live action, ensuring the user does hot miss a moment they would like to record.

It should be noted that in alternate embodiments, the transition toolbar 701 may not overlay the main display 501 but may be displayed to the user in a separate screen. Even though in one embodiment the user has an option to choose a transition or delete a video clip immediately after the user pauses the recording of the video clip, the invention is not so limited and in some embodiments the user may also choose the transition or delete a video clip at any time during or after the current recording session.

Referring to FIG. 8, the view of the display device 401 after the recording of a single video clip or photograph according to an embodiment of the present invention is illustrated. As shown in FIG. 8, the action button 502 is set to the "add video" state and the main display 501 displays an image Of a real-world event perceived by the lens 402 of the portable device 400. If the user chooses to include additional video clips into the composition, the user operates the action button 502, the recording of an additional video clip begins, and the display device 401 returns to a screen similar to that shown in FIG. 5. Alternatively, the user may choose to end and save the composition, thereby ending the single recording session, by pressing the save button 603. If the user chooses to save the composition, depending On the recording mode chosen by the user, various option screens may be presented. Ultimately, the user does not have to download the individual video clips and photographs to a personal computer and edit the individual media segment's in another application or program, or on another device. The entire completed composition is created for the user on the portable device in real-time as the clips are being recorded during one single recording session, the completed composition saved to the memory 406 of the portable device 400 as a single file.

Figure 9:
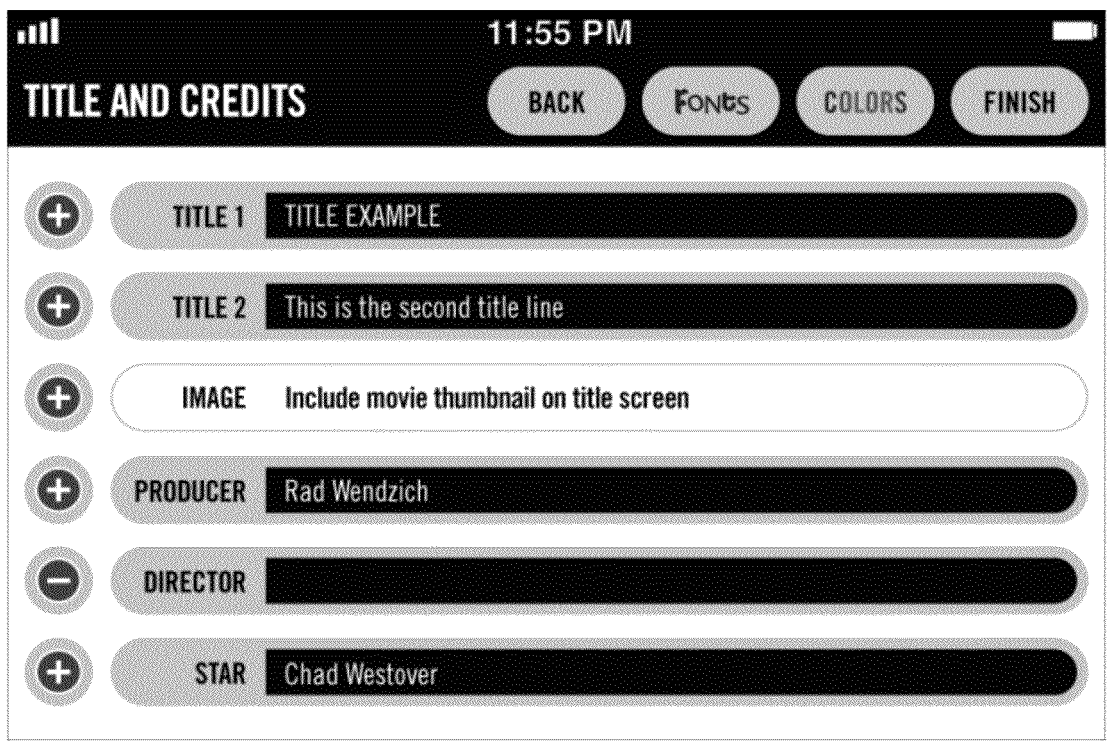
FIG. 9 is a perspective view of a title and credits selection screen according to one embodiment of the present invention.

Referring to FIGS. 9-16, an example of steps that may be presented after saving a composition and ending the recording session according to an embodiment of the present invention is illustrated. As shown in FIG. 9, after the user presses the save button 603, the recording session is concluded and the user is provided with the option to add a title and credits to the composition. The title may include text, video clip and/or a photograph and is usually the first segment of the composition. It should be noted that in alternate embodiments, a title may be chosen during the recording session. Additionally, an image or photograph can be included on the title screen of the composition. Further, the user may also create a director, a producer, and a number of actors/participants (including a star). It should be noted that the present invention is not limited to any specific number of participants or stars.

Figure 10:
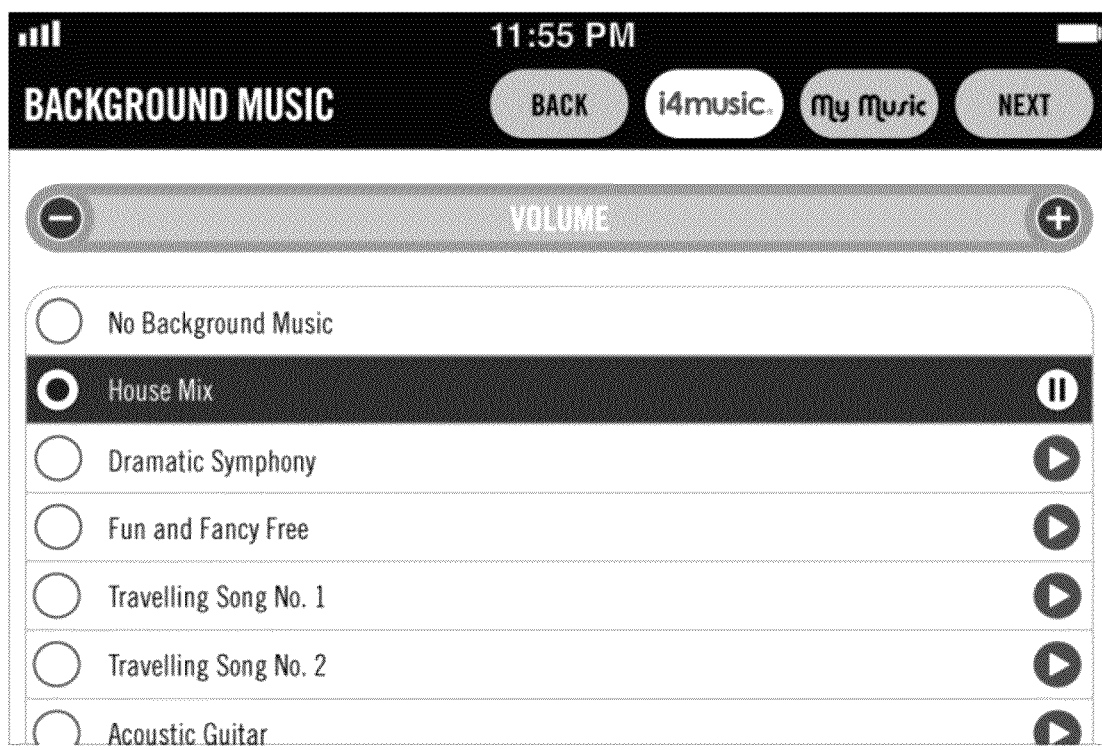
FIG. 10 is a perspective view of an audio selection screen containing a custom library of music backgrounds provided by the application according to one embodiment of the present invention.
Figure 11:
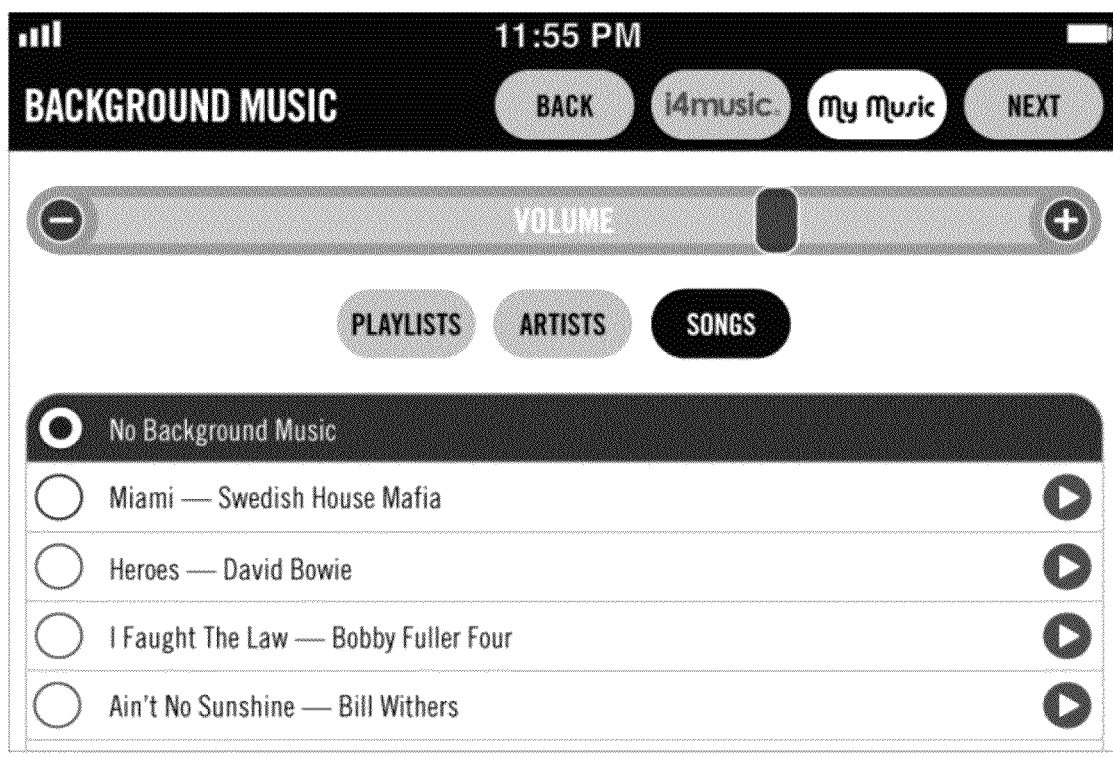
FIG. 11 is a perspective view of another audio selection screen displaying the music library owned by the user according to one embodiment of the present invention.
Figure 12:
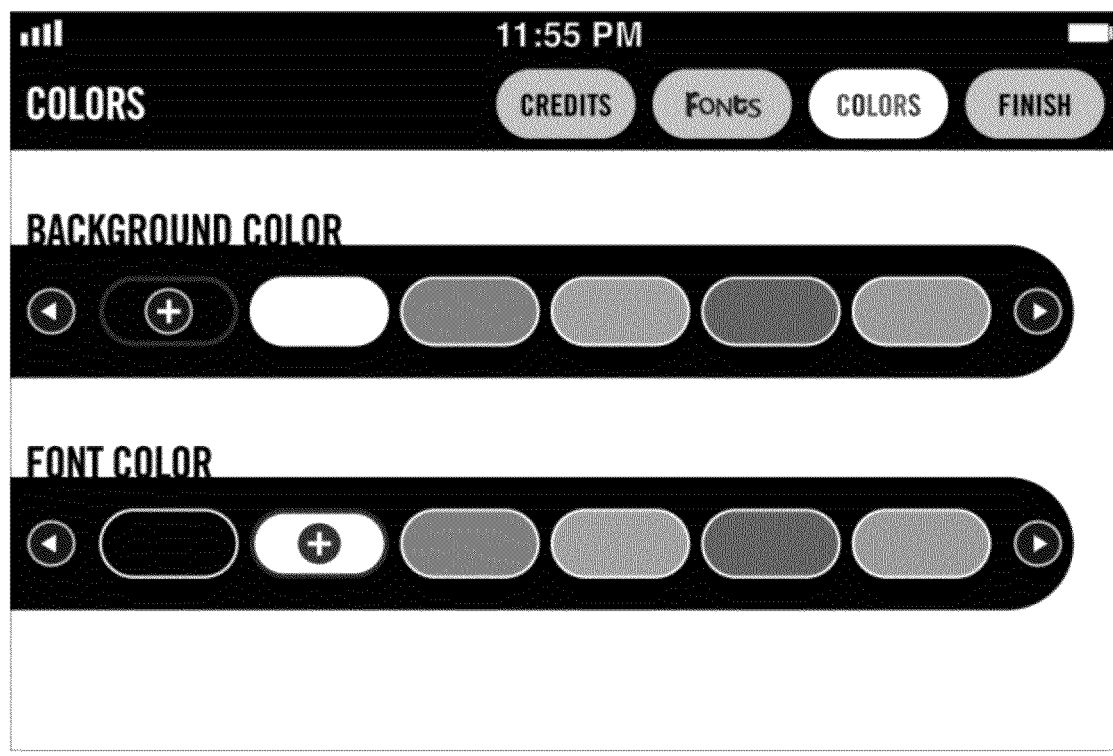
FIG. 12 is a perspective view of a color selection screen according to one embodiment of the present invention.

After deciding whether to enter a title and/or credits, the user is prompted to choose background music to the composition. As shown in FIGS. 10 and 11, the user may choose music from the i4 Music library or from the user's own collection of music saved in the memory 406 of the portable device 400. The i4 music library is a collection of music that is provided with the present invention. The user may set the volume of the music for the composition. It should be noted that in alternate embodiments, music may be chosen during the recording session. Further, the user may choose a different music clip for each individual video clip, photograph or transition of the composition.

Figure 13:
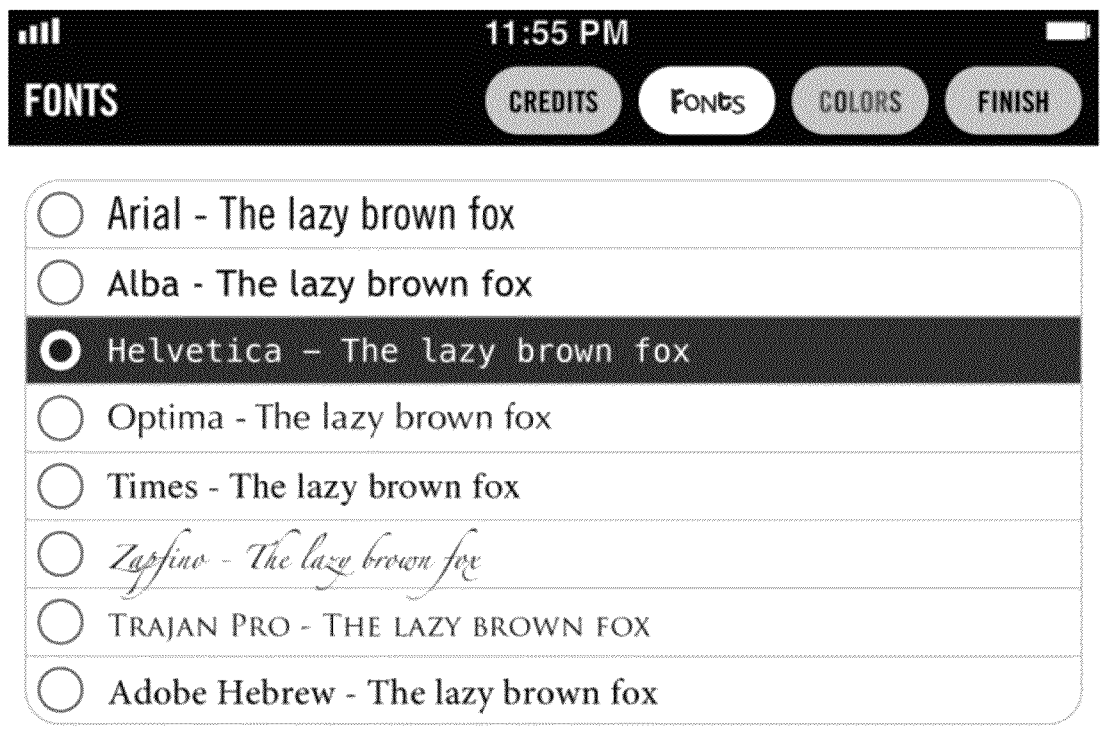
FIG. 13 is a perspective view of a font selection screen according to one embodiment of the present invention.

After the user chooses music for the composition, the user may choose the font color and background color of the composition (shown in FIG. 12) and choose the font type for the composition (shown in FIG. 13). It should be noted that in alternate embodiments, credits, font color, background color and/or font type may be chosen during the recording session.

Figure 14:
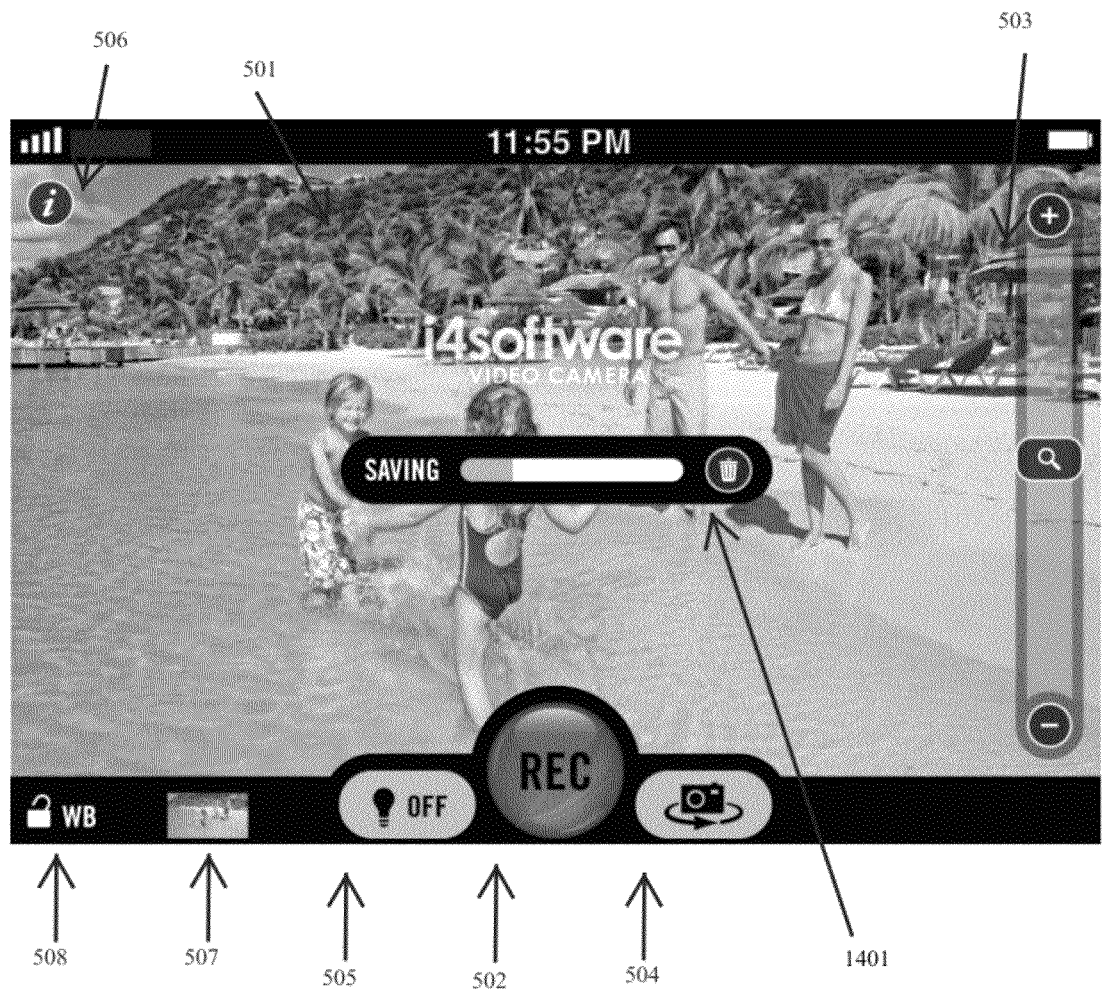
FIG. 14 is a perspective view of a display of a portable device while a composition is being saved according to one embodiment of the present invention.

Referring to FIG. 14, after completing the composition and setting all the options, the composition is then saved to the memory 406 of the portable device 400 as a single file. Since the composition is saved as a single file, the memory 406 of the portable device 400 is riot cluttered with a plurality of individual video clips and photographs, but rather just the finalized composition. However, as noted above the user may choose to save the finalized composition as a single file and each individual video clip and photograph as individual files in the memory 406 of the portable device 400. As shown in FIG. 14, a save bar 1401 may be displayed on the display 401 to inform the user of the save progress and when the saving of the composition is complete. It should be noted that in an alternate embodiment of the present invention, the composition is also saved to the memory 406 of the portable device 400 as a single file prior to displaying the option screens to the user.

Figure 15:
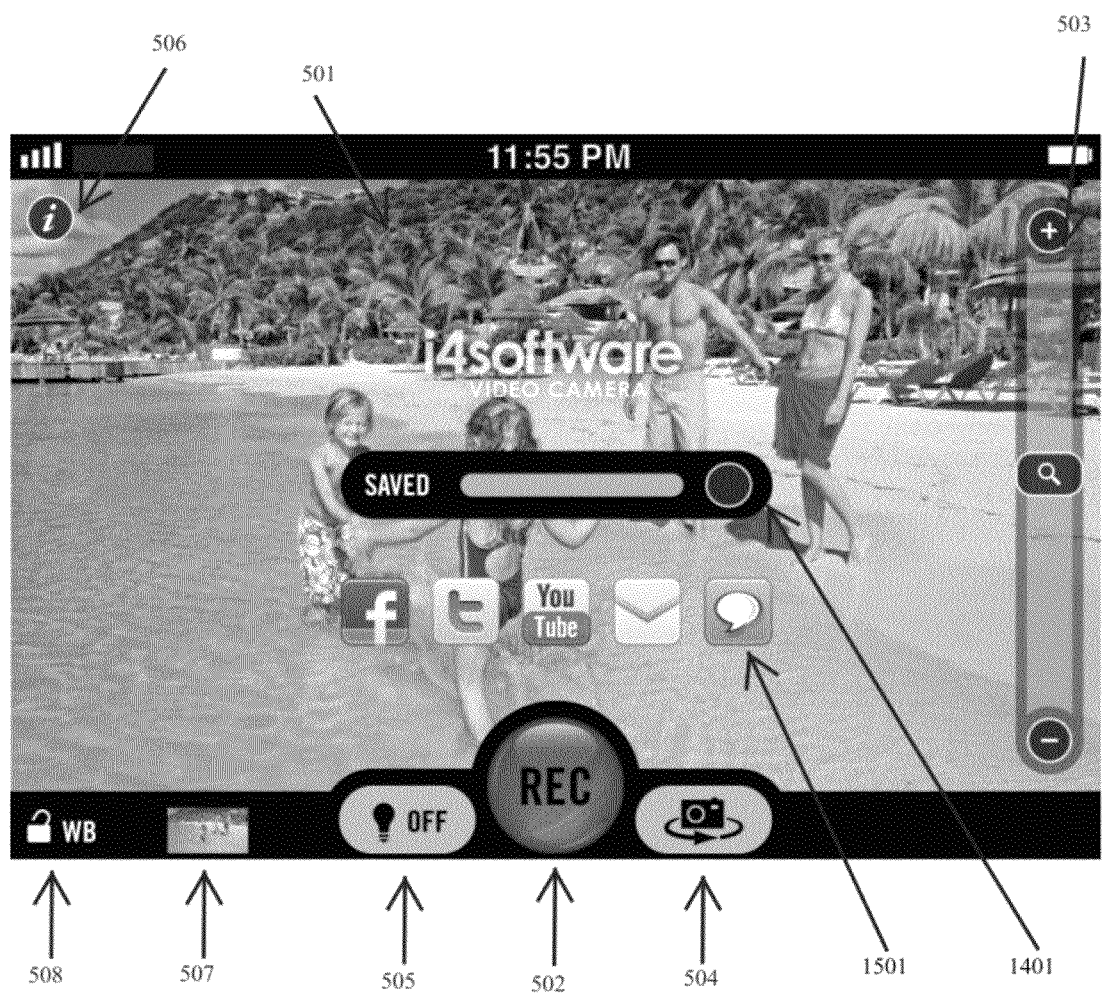
FIG. 15 is a perspective view of a display of a portable device after a composition is saved according to one embodiment of the present invention.

Referring to FIG. 15, after saving the composition and assuming the portable device 400 has a wired or wireless connection to the internet or a service provider network, the user may automatically upload the composition to a social media site, such as but not limited to, Facebook®, Twitter® or YouTube®, and share the composition using email or multimedia messages through the use of a sharing toolbar 1501. In the preferred embodiment, the first time the user uploads a composition to a social media site or shares a composition using email or multimedia message, the user is prompted to enter their user name and password. Thereafter, the present invention saves the user's information so future compositions may be unloaded and shared quickly and easily without requiring the user to re-enter their information. In alternate embodiments, the user may enter their user name and password information under an accounts menu of the present invention.

It should be noted that the invention is not so limited and in alternate embodiments the type and configuration of options presented to the user may be varied to include any Options that could alter the appearance or presentation of the composition.

As noted above, upon saving the composition and ending a recording session, the user is presented with the above described options. In alternate embodiments, the options may also be configured whenever the user selects the preference button 506 during a recording session and during the creation of a composition. The options may include any options that add to or alter the appearance or presentation of the composition, such as, for example adding a title, credits, font types, colors and background music. However, it should be noted that the user may also select music, credits and titles at any time they choose, including during or after the completion of the composition. For example, if the user has a long break between recording video clips or has time to kill during a recording session, the user could add the music, title or credits then and then not have to set those options after the composition is complete.

Figure 16A:
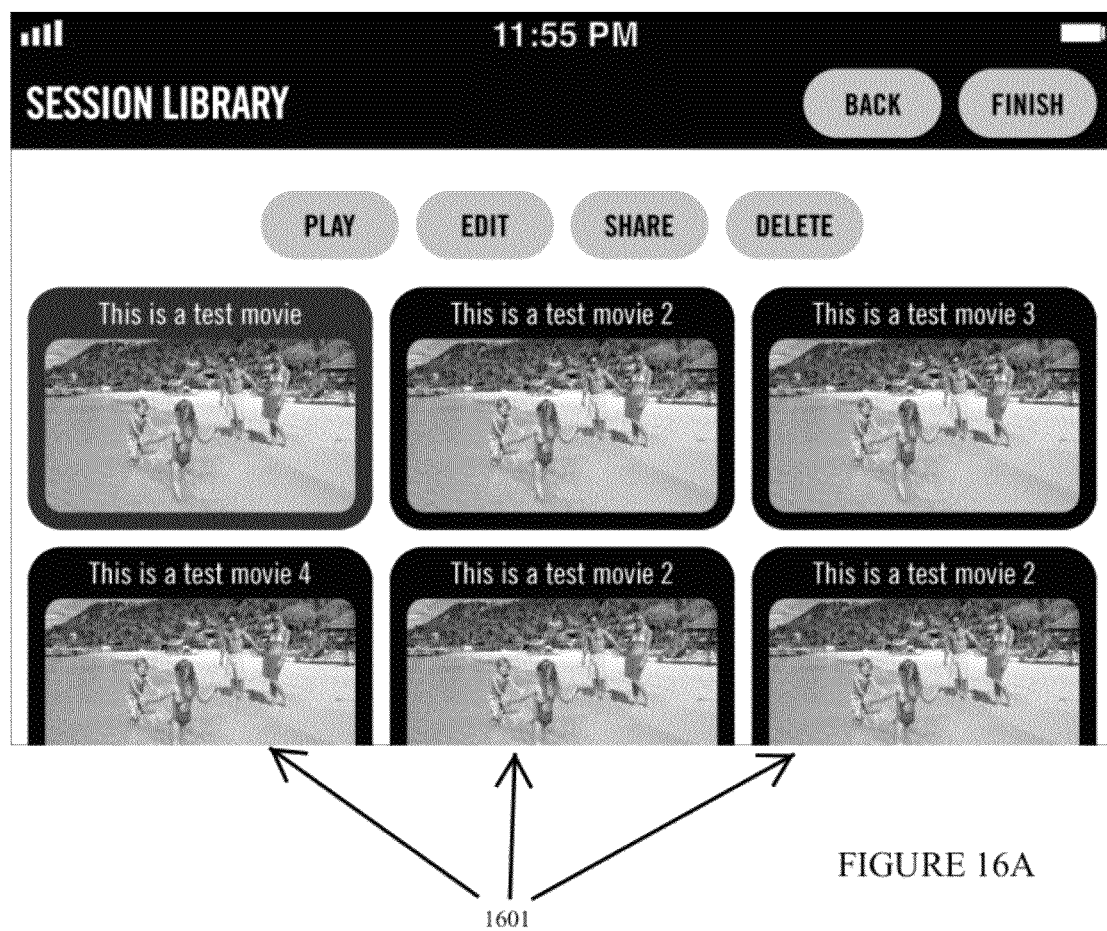
FIG. 16A is a perspective view of a session library screen according to one embodiment of the present invention.
Figure 16B:
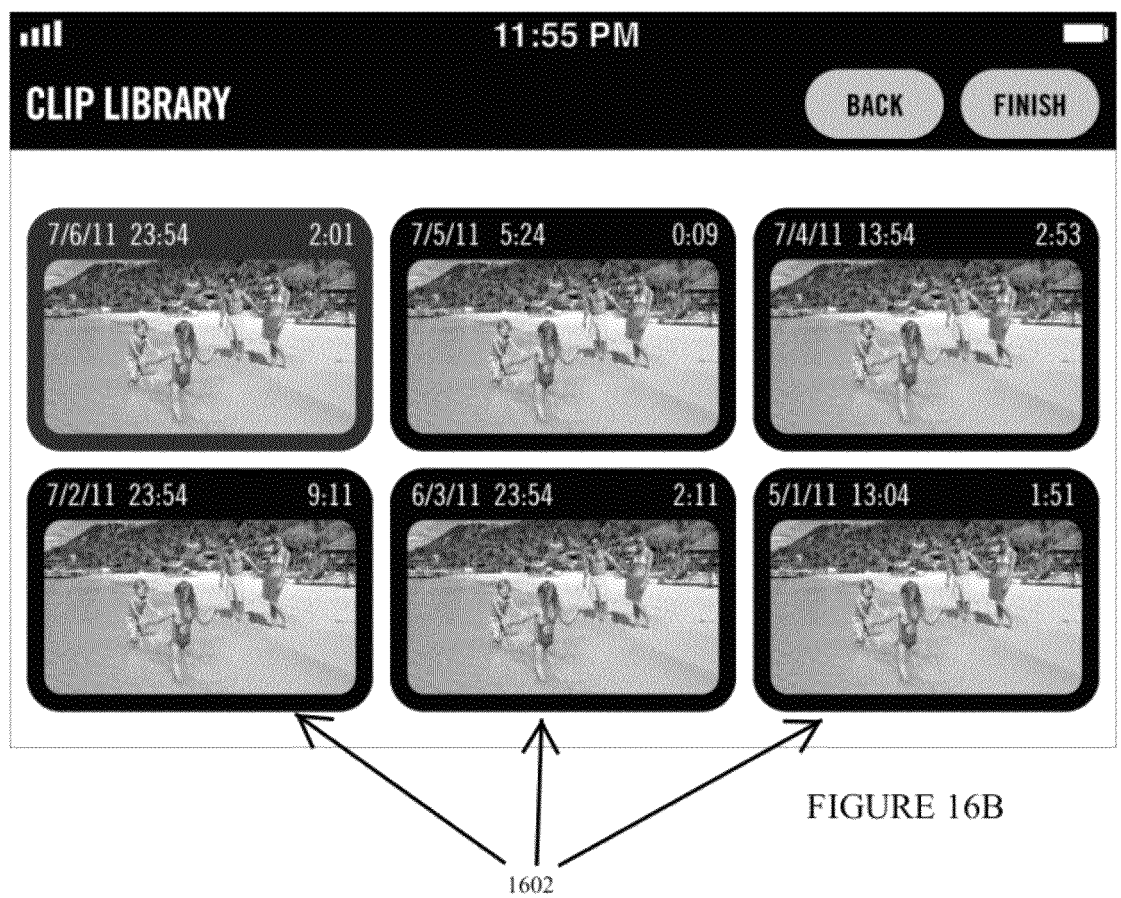
FIG. 16B is a perspective view of a clip library screen according to one embodiment of the present invention.

As noted above and referring to FIG. 16A, the present invention comprises a session library that may be viewed by pressing the library button 507 prior to the start of a new composition. The session library allows the user to view all of their saved compositions 1601. Further, in the media library, the user is able to play, edit, share and delete their saved compositions 1601. Referring to FIG. 16B, a clip library according to an embodiment of the present invention is illustrated. The clip library allows the user to view previously recorded media segments 1602 (video clips and photographs) that were recorded by a different application or device. The clip library may be viewed by pressing the library button 507 during the recording session of a composition. As discussed in detail below, the previously recorded media clips 1602 may be incorporated into a composition during the creation of the composition. This allows for a non-linear creation of a composition. It should be noted that although the present invention comprises both a session library (FIG. 16A) and a clip library (FIG. 168), in alternate embodiments the two libraries can be combined into one.

Figure 18:
FIG. 18 is a perspective view of a manufacturer information screen according to one embodiment of the present invention.

Referring to FIG. 18, an example of a manufacture screen of the present invention is illustrated. The manufacturer screen of the present invention may show other products and applications available from the manufacturer of the present invention. Further, the manufacturer screen may also provide product updates, demos, and feedback from the manufacturer.

As noted above, FIGS. 19A-B illustrate an example of a list of settings according to an embodiment of the present invention. As shown in FIG. 19A, the user may have the option to add gridlines to the main display 501, to save the-individual video clips and/or photographs to memory 406, to allow for a "strobe mode" for the flash, to date and time stamp the individual video clips and/or photographs, and to adjust the camera's resolution. Further, using the toggle arrow, the user may be cycled to additional settings. For example and as shown in FIG. 19B, the user may have the option to have music auto selected and incorporated into each media segment (video clip or photograph) of the composition, the user may use face detection or voice detection to establish the individuals who are recorded in a particular media segment, or the user may have subtitles of recorded speech, automatically incorporated into recorded video clips of a composition. The invention is not so limited and in alternate embodiments other options that provide for greater camera/camcorder customization and flexibility may be included. For example, any of the Referring to FIG. 20, one example of a "Join Us" screen according to an embodiment of the present invention is illustrated. The "Join Us" screen allows the user to follow the manufacture of the present invention on social media sites and through email and text/multimedia messages.

Referring to FIG. 21, an example of an embodiment of camera sharing of the present invention where the switch lens button 504 is configured to allow for camera sharing between multiple portable devices is illustrated. As shown in FIG. 21, the switch lens button 504 brings up an overlaid camera selection bar 2101 whereby a user is able to select from a plurality of shared cameras using their respective icons 2102. Although the icons 2102 of the camera selection bar 2101 are illustrated as generic blocks with the name of the respective camera, it should be understood that in alternate embodiments the icons 2102 of the camera selection bar 2101 may be real-time thumbnail previews of each connected remote camera so that a user may decide which angle or shot they would like to capture next in their composition. After the user selects one of the shared cameras, the shared camera number is displayed on the switch lens button 504, and an image of a real-world event perceived by the selected lens is displayed on the main display 501. It should be noted that the selected lens may be a lens 402 of the portable device 400 or it may be a lens of another portable device. Such embodiments of the present invention allow for the user to be able to share cameras through a wired or wireless connection with other users who also have the present invention. This enables the user to switch not only between the lenses 402 on their portable device 400 but also between other lenses on devices nearby or throughout the world while paused or recording so that a video clip recorded from a remote lens can be inserted into the composition in real-time and during a single recording session.

When camera sharing, the portable device 400 may be connected to at least one other secondary device through a wired or wireless connection, such as the internet, WiFi®, Bluetooth®, or a wireless communication protocol through a service provider. The second portable device may be in the same general vicinity or may be across the world from the user's portable device 400. Therefore, camera sharing is not limited to distance and is available as long as both devices have established a communication link between each other. Further, there is no limit to the number of other secondary devices that the portable device 400 may share cameras with during a single recording session.

As noted above, when camera sharing, the user may switch the display of the main display 501 to present an image of a real-world event perceived by any lens it is connected with. Therefore, the present invention may be used to record a video clip and/or photograph from the lens of the secondary portable device and seamlessly include the recording into the composition residing on the portable device 400. In such embodiments, the present invention is configured such that the portable device 400 may be wirelessly connected to at least one other portable device also having the present invention residing thereon. After a connection has been initialized the user may then use the present invention residing on their portable device 400 to control and record video clips and photographs taken by the secondary portable device 400. Further, the user may control the lens of the secondary portable devices to zoom in or out from the real-world event. Moreover, the user may adjust the zoom, the flash, and other settings of the secondary portable device using the present invention residing on their portable device 400. Therefore, a user of the present invention may record video clips and/or photographs from both the lens of their portable device 400 and multiple secondary portable devices during a single recording session, thereby allowing the user to create compositions that include video clips and/or photographs taken from a plurality of portable devices, each of the portable devices having its own lens.

In an alternate embodiment of the present invention, the user may access secondary or remote devices and share video clips or photographs recorded by their portable device 400 through Game Center® Xbox Live® or other online gaming networks or central servers offered by directly or thru third parties. User authentication, password access restrictions and other-security measures will prevent unauthorized or unintended camera access. In such embodiments, instead of the remote camera's name or number showing up in the camera selection bar 2201, the user's gaming username or account username of camera code name may show up instead. This allows user's of the present invention to dynamically incorporate video clips or photographs recorded by secondary or remote devices into compositions created and saved on their portable device 400 during one single recording session.

Referring to FIG. 22, a perspective view of the display device 401 during the recording of a video clip according to an alternate embodiment of the present invention is illustrated. Similar to FIG. 6 described above, the display device/401 of FIG. 22 comprises a main display 501, an action button 502, zoom bar 503, a switch lens button 504, a flash button 505, and a preference button 506, a composition duration indicator 601, a save button 603, and a current state indicator 604. The difference between the display device 401 of FIG. 22 and the display device 401 of FIG. 6 is the display device 401 of FIG. 22 comprises a camera icon 605 in lieu of the media segment number indicator 602. The camera icon 605 if configured to record a photograph similar to the method described above with reference to the media segment number indicator 602 of FIG. 6.

In other alternate embodiments, the present invention is further configured for a live, non-linear creation of a composition 300. When creating a composition in a non-linear method, the present invention allows a user to decide what order they want video clips and photographs to appear in the composition during or right after the recording the video clips and photograph, and during the creation of the composition. Therefore, during the creation of a composition, the user does not have to leave the main display 501 and go to the edit screen (as shown in FIG. 17) in order to alter the order or insert previously recorded video clips or photographs into the composition. Stated simply, as opposed to a linear-creation of a composition where-the video clips and photographs are included in the composition in the order they are recorded, a non-linear creation of a composition allows the video clips and photographs to be included into the composition in an any order desired by the user. It should be noted that the first media segment (video clip or photograph) in the composition may be a previously recorded media segment that was previously recorded using the present invention or created with a separate application or device. Therefore, the first media segment of a composition does not have to be a live recording, but may be a loaded, previously recorded media segment.

Referring to FIG. 23, a perspective view of the display device 401 after the recording of a video clip or photograph and the selection of a transition according to an (alternate embodiment of the present invention is illustrated. Stated simply, FIG. 23 is a perspective view of the display device 401 after FIG. 7, and in lieu of FIG. 8, according to an alternate embodiment of the present invention. Similar to FIG. 8 described above, the display device 401 of FIG. 23 comprises a main display 501, an action button 502, zoom bar 503, a switch lens button 504, a flash button 505, and a preference button 506, a composition duration indicator 601, a media segment number indicator 602, a save button 603, and a current state indicator 604. The display device 401 of FIG. 24 further comprises delete button 2301 and add media button 2302, the operations of which are described in detail below. Prior to recording a video clip and after the user pauses the composition, which in turn completes the recording of the video clip as discussed above, the delete button 2301 and the add media button 2302 are configured to pop up above the save button 603 and the media segment number indicator 602 respectively.

Referring to FIG. 24, a perspective view of the display device 401 after the delete button 2301 is operated according to an embodiment of the present invention is illustrated. The delete button 2301 is configured to allow a user to delete the most recently recoded media segment (video clip or photograph) from the composition. If the delete button 2301 is operated, a delete options menu 2401 is overlaid over the main display 501 of the display device 401. According to one embodiment of the present invention, the delete options menu 2401 is configured to allow a user to choose between various options, such as (1) delete forever, (2) save to roll, or (3) cancel the operation. If the user chooses to delete the just recorded media segment forever, the just recorded video clip or photograph is not included in the composition and not save in the memory 406 of the portable device 400. If the user chooses to save the just recorded media segment to the camera roll, then the just recorded video clip or photograph is not included in the composition being created; but the recorded video clip or photograph is saved to the memory 406 of the portable device 400. Therefore, at any later time, the user may include the video clip or photograph in this composition or another using the add media button 2302, described in more detail below. After the user chooses an option from the delete options menu 2401, the display device 401 returns to a display similar to that shown in FIG. 23, whereby the creation of the composition is still in progress.

Referring to FIG. 25, a perspective view of the display device 401 after the add media button 2302 is operated according to an embodiment of the present invention is illustrated. The add media button 2302 is configured to allow a user to add additional previously recorded media segments (video clips and photographs) to their composition as the composition is being recorded. If the add media button 2302 is operated, an add media clip selection toolbar 2501 is overlaid over the main display 501 of the display device 401. The clip selection toolbar 2501 is configured to allow the user to select previously recorded media segments (video clips and photographs) saved in their clip library (shown in FIG. 16B). Further, since the add media button 2302 and the clip selection toolbar 2501 are operable while still viewing live events through the main display 501, the user does not have to miss a potential recording moment while attempting to add additional previously recorded media segments to their composition.

In one embodiment, the previously recorded media segments are be video clips and photographs recorded by the portable device 400 during the creation of the current composition or current recording session. Further, in other embodiments, the previously recorded media segments may be video clips and photographs that have been recorded by another application or another device, but which are saved in the memory 406 of the portable device 400. Moreover, the previously recorded media segments may have additional effects already included therein. For example, a user may choose to add a previously recorded video clip that has special effects already added thereto into the composition.

In an alternate embodiment, the add media button 2302 is configured to add a content file. The content file may be a video clip previously recorded by the portable device 400, a photograph previously recorded by the portable device 400, a video clip previously recorded by a second device, a photograph previously recorded by the second device, a video clip comprising pre-added effects, a photograph comprising pre-added effects, a transition, a music background, or any other effect or data file.

Referring to FIG. 26, a perspective view of the display, device 401 after a user selects a previously recorded media segment (video clips and photographs) from the clip selection toolbar 2501 according to an embodiment of the present invention is illustrated. After the user selects to add a media segment using the add media button 2302 and the user selects a media segment from the clip selection toolbar 2501, a clip insertion toolbar 2601 is overlaid over the main display 501 of the display device 401. The clip insertion toolbar 2601 presents the composition being created in a timeline format, displaying the individual media segments and transitions as tiles on the toolbar 2601. Further the clip insertion toolbar 2601 is configured to allow a user to select where in the composition they would like to include the selected media segment. In the embodiment exemplified in FIG. 26, the user chooses the location by selecting one of the radio buttons 2702 located on the clip insertion toolbar 2601. Upon selecting a radio button 2702 and thus a location in the composition to insert the selected media segment, the media segment is inserted into the composition.

The clip insertion toolbar 2601 is further configured to allow a user to edit their composition using the edit toolbar 2603. It should be noted that the edit toolbar 2603 is substantially similar in presentation and operation as the edit toolbar 1705 illustrated in FIG. 17 above. Therefore, the user may edit each video clip, photograph, transition and other segment (title, credits, music, etc.) of the composition using the edit toolbar 2603 while still viewing live events through the main display 501 of the displace device 401.

Further, in an alternate embodiment, the user may operate the; add media button 2302 and decide not to include anew video clip, but rather just re-order to edit the existing media segments in their composition. In such a case, the user would selection an option on the clip selection toolbar 2501 to not include a new clip, whereby the clip insertion toolbar 2601 would be presented on the main display 501 to allow the user to edit their composition while maintaining a live view in the main display 501.

It should be noted that in any of the described or exemplified embodiments discussed above if the user operates the action button 502 while the transitional selection toolbar 701/2701, a clip selection toolbar 2501, the clip insertion toolbar 2601, or any other toolbar or menu is overlaid over the main display 501, a default selection is automatically made for the user, the toolbar or menu is removed from the main display 501 and the recording of a new video clip begins. For example, if the user has just recorded a video clip and is in the process of selecting a transition to include after the video clip, and a transition toolbar 701/2701 is overlaid on the main display 501, the user may operate the action button 502 to record an additional clip, whereby the present invention will automatically select a default transition in lieu of receiving a user selected transition using the transition toolbar 701/2701. Therefore, the user can record an additional video clip at any time during the creation of the composition, regardless of what step Or what toolbar/menu is overlaid over the main display 501. Essentially, as long as the action button 502 remains on the main display 501, the user may almost instantaneously record an addition video clip to be added to their composition.

Referring to FIG. 27, a perspective view of the display device 501 allowing the user to select a transition according to one embodiment of the present invention is illustrated. After the user selects the position to insert the selected media segment using the clip insertion toolbar 2601 and makes any other edits to their composition using the clip insertion toolbar 2601 and the edit toolbar 2603, the display device 401 allows the user to select an additional transition to insert using the transition toolbar 2701. It should be noted that the transition toolbar 2701 is substantially similar is presentation and operation as the transition toolbar 701 described above with respect to FIG. 7. After the user selects a transition, the display device 501 returns to a screen similar to that shown in FIG. 23, whereby the user may continue to record additional media segments to be dynamically incorporated into their composition. However, it should be noted that in alternate embodiments the transition toolbar may be omitted after inserting a previously recorded media segment.

Still referring to FIG. 27, an add music button 2702 and an add title/caption button 2703 according to one embodiment of the present invention is illustrated. It should be noted that although the add music button 2702 and the add title/caption button 2703 are not illustrated in other embodiments exemplified herein, the present invention is not so limited and in alternate embodiments the add music button 2702 and the add title/caption button 2703 may be incorporated into the composition creation process at any point during a recording session, including prior to the user recording a first media segment.

Referring to FIG. 28, a perspective view of the display device 501 after the add music button 2702 is operated according to one embodiment of the present invention is illustrated. After the user operates the add music button 2702, a music selection toolbar 2801 is overlaid over the main display 501 of the display device 401. The music selection toolbar 2801 is configured to allow the user to select a music background from their music library (shown in FIGS. 10 and 11) to be incorporated with the most recently recorded or selected media segment of the composition currently being created. Although the music selection toolbar 2801 exemplified in FIG. 28 separates music by genre, the invention is no so limited and any other, display or categorization of available music may be used. After the user selects a music background segment, the music segment is incorporated into the composition to be played only during the particular media segment, preferably video clip, it is associated with. However, it should be noted that the invention is not so limited and in alternate embodiments the selected music background segment may be played during the entire composition or during multiple media segments of the composition. After the user selects a music segment, the display device 501 returns to a screen similar to that shown in FIG. 23, whereby the user may continue to record additional media segments to be dynamically incorporated into their composition.

Referring to FIG. 29, a perspective view of the display device 501 after the add title/caption button 2703 is operated according to one embodiment of the present invention is illustrated. After the user operates; the add title/caption button 2703, a title/caption toolbar 2801 is overlaid over the main display 501 of the display device 401. The title/caption toolbar 2801 is configured to allow the user to enter a caption to the just recorded or just added media segment. For example, the user may add a note to title to a recorded video clip or photograph. After the user selects a title/caption, the display device 501 returns to a screen similar to that shown in FIG. 23, whereby the user may continue to record additional media segments to be dynamically incorporated into their composition.

In an alternate embodiment, the present invention further comprises an Easy Recording Mode. In the Easy mode, the user will hot have the ability to insert pre-recorded media segments (but can record media segments), to insert custom transitions between media segments, or customize their composition during the creation thereof. Therefore, in Easy mode, default transitions, music backgrounds and other effects will be auto-selected and the title and credits will be auto-build from date and location information.

In another alternate embodiment, the present invention is further configured so that if a user exits the present invention on their portable device 400, perhaps to answer a phone call, take a picture or video clip with a secondary program, or simply save battery, the state of the present invention is maintained so that a user may return and continue to create their composition without having to start over or manually load their composition. For example, if the user is recording a composition and is currently in the pause state (between the recordings of media segments) and the user exits the present invention, the next time the user re-enters the present invention the user is returned to the same composition they were previously recoding still in the pause state. Therefore, the present invention allows a user to begin a recording session, and without ever ending or concluding the recording session, exit the present invention, record a media segment with a secondary program, and return to the recording session to include the media segment recorded with the secondary program.

Therefore, the above described non-linear composition creation method allows a user to dynamically create a composition in a non-linear format. Stated simply, the media segments (video clips and photographs) comprising the composition do not have to be presented in the order they are recorded, allowing for a more personalized and more flexible composition creation method.

While the foregoing description and drawings represent the exemplary embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and hot restrictive, the scope of the invention being defined by the appended claims, and not limited to the foregoing description or embodiments.

What is claimed is:

1. A system for dynamically creating a video composition comprising:
   a portable device comprising a camera lens, a processor, a memory device, and a display device, wherein the portable device is configured to execute video composition software, the software instructing the portable device to:
   a) record a first temporal part of a real-world event as a first video clip in response to a first user record input, wherein the user record input delimits a beginning of the first video clip;
   b) display an image of the real-world event while the camera lens is perceiving the real-world event during the recording of the first temporal part of the real-world event;
   c) stop recording the first temporal part of the real-world event in response to a first user pause input, wherein the user pause input delimits an end of the first video clip;
   d) display an image of an unrecorded part of the real-world event while the camera lens is perceiving the real-world event;
   e) display a transition selection toolbar as an overlay on the displayed unrecorded part of the real-world event while simultaneously displaying a record button, both the transition selection toolbar and the record button being actively user-selectable, and receive as input one of a user transition selection input indicating a transition selected from the displayed transition selection toolbar or a second user record input indicating selection of the record button;

f) in response to receiving the user transition selection input, combine the first video clip and the selected transition to create the video composition; and g) save the video composition on the memory device as a single file in response to a user save input.

2. The system of claim 1 the software further instructing the portable device to present editing options for the video composition subsequent to step c).

3. The system of claim 1 wherein between steps c) and g), the software further instructs the portable device to record, in response to the second user record input, a second real-world event as a second video clip, and wherein in step f) the software further instructs the portable device to combine the first video clip, the selected transition, and the second video clip to create the video composition.

4. The system of claim 3 wherein the second real-world event is perceived by a second camera lens that is different than the camera lens that perceived the first real-world event.

5. The system of claim 1 wherein between steps d) and g), the software further instructs the portable device to display a music selection toolbar and receive a user music selection input to identify a music clip, and combine the first video clip, the selected music clip, and the selected transition to create the video composition.

6. The system of claim 1 wherein the software further instructs the portable device to perform steps a) through g) during a single recording session, and wherein the single recording session does not have to be concluded in order to record additional real-world events as subsequent video clips, add additional transitions, change previously selected transitions, add a title, add credits, or add a music clip using the video composition creation program.

7. The system of claim 1 the software further instructing the portable device to upload the single file to an external website or sending the single file through multimedia message or email using the video composition creation program.

8. A system for dynamically creating a video composition comprising:
   a portable device comprising a camera lens, a processor, a memory device, and a display device, wherein the portable device is configured to execute video composition software, the software instructing the portable device to:

a) record a first temporal part of a real-world event as a first video clip in response to a first user record input, wherein the user record input delimits a beginning of the first video clip;

b) display an image of the real-world event while the camera lens is perceiving the real-world event during the recording of the first temporal part of the first real-world event;

c) stop recording the first temporal part of the real-world event in response to a first user pause input, wherein the user pause input delimits an end of the first video clip;

d) display an image of an unrecorded part of the real-world event while the camera lens is perceiving the real-world event:

e) display a content file selection toolbar as an overlay on the displayed unrecorded part of the real-world event while simultaneously displaying a record button, both the content file selection toolbar and the record button being actively user-selectable, and receive as input one of a user content file selection input indicating a content file selected from the displayed content file selection toolbar or a second user record input indicating selection of the record button;

f) in response to receiving the user content file selection input, combine the first video clip and the selected content file to create the video composition; and g) save the video composition on the memory device as a single file in response to a user save input.

9. The system of claim 8 wherein the content file is a video clip previously recorded by the portable device, a photograph previously recorded by the portable device, a video clip previously recorded by a second portable device, a photograph previously recorded by the second portable device, a video clip comprising pre-added effects, a photograph comprising pre-added effects, a transition, or a music background.

10. The system of claim 8 wherein the software further instructs the portable device in step e) to receive a user position input for a user selected position in the composition and to insert the content file at the user selected position in the composition.

11. The system of claim 10 wherein the content file is a video clip previously recorded by the portable device, and wherein the software further instructs the portable device to position the content file after the first video clip in the composition even though the content file was recorded prior to the recoding of the first video clip.

12. The system of claim 8 wherein between steps c) and f), the software further instructs the portable device to record, in response to the second user record input a second real-world event as a second video clip, and wherein in step f) the software further instructs the portable device to combine the first video clip, the selected content file, and the second video clip to create the video composition.

13. The system of claim 12 wherein the second real-world event is perceived by a second camera lens that is different than the camera lens that perceived the first real-world event.

14. The system of claim 8 wherein the software further instructs the portable device to perform steps a) through g) during a single recording session, and wherein the single recording session does not have to be concluded in order to record additional real-world events as subsequent video clips, add additional content files, change previously selected content files, add transitions, add a title, add credits, or add a music clip using the video composition creation program.

* * * * *